United States Patent
Meylan et al.

(10) Patent No.: US 9,137,737 B2
(45) Date of Patent: Sep. 15, 2015

(54) SYSTEMS AND METHODS FOR MONITORING OF BACKGROUND APPLICATION EVENTS

(75) Inventors: Arnaud Meylan, San Diego, CA (US); Liat Ben-Zur, San Diego, CA (US); Gerardo Giaretta, San Diego, CA (US); Tejash R. Shah, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 339 days.

(21) Appl. No.: 13/490,408

(22) Filed: Jun. 6, 2012

(65) Prior Publication Data

US 2013/0052965 A1   Feb. 28, 2013

Related U.S. Application Data

(60) Provisional application No. 61/543,701, filed on Oct. 5, 2011, provisional application No. 61/528,628, filed on Aug. 29, 2011.

(51) Int. Cl.
*H04B 17/00* (2006.01)
*H04W 48/08* (2009.01)
(Continued)

(52) U.S. Cl.
CPC ............... *H04W 48/08* (2013.01); *H04B 17/26* (2015.01); *H04W 52/02* (2013.01)

(58) Field of Classification Search
USPC ............... 455/69, 73, 67.11, 522, 126, 456.1, 455/432.1, 26.1, 457, 14, 550.1, 67.1
See application file for complete search history.

(56) References Cited

U.S. PATENT DOCUMENTS 5,737,687 A * 4/1998 Martin et al. .................... 455/14
6,115,744 A    9/2000 Robins et al.
(Continued)

FOREIGN PATENT DOCUMENTS

CN    102186167 A    9/2011
EP      2019517 A1    1/2009
(Continued)

OTHER PUBLICATIONS

Ananthanarayaran G., et al., "A New Communications API", Electrical Engineering and Computer SciencesUniversity of California at Berkeley, May 25, 2009, pp. 1-14, XP002676108, Retrieved from the Internet: URL:http://www.eecs.berkeley.edu/Pubs/Tech Rpts/2009/EECS-2009-84.pdf [retrieved on May 16, 2012].
(Continued)

*Primary Examiner* — Ganiyu A Hanidu
(74) *Attorney, Agent, or Firm* — Howard Seo

(57) ABSTRACT

Systems, methods, and devices for implementing a communication access policy are described herein. In some aspects, a wireless device is configured to execute a plurality of applications and to communicate with a communication network. The wireless device comprises a receiver configured to receive a plurality of rules specifying how one or more of the plurality of applications should communicate with the communication network. The wireless device comprises a processor configured to delay communication by one or more of the plurality of applications in compliance with the rules. The processor is further configured to allow transmission of the communication by one or more of the plurality of applications after termination of the delay. In one aspect, the processor is configured to separately record communication statistics based on whether the device is in a background or foreground state.

72 Claims, 13 Drawing Sheets

(51) Int. Cl.
*H04W 52/02* (2009.01)
*H04B 17/26* (2015.01)

(56) References Cited

U.S. PATENT DOCUMENTS

| | | | |
|---|---|---|---|
| 6,122,514 | A | 9/2000 | Spaur et al. |
| 6,181,919 | B1* | 1/2001 | Ozluturk ........................ 455/69 |
| 6,198,911 | B1* | 3/2001 | Lea et al. ........................ 455/126 |
| 7,107,063 | B1* | 9/2006 | Bates et al. ................. 455/456.1 |
| 7,251,490 | B2 | 7/2007 | Rimoni |
| 7,486,954 | B2 | 2/2009 | Lee et al. |
| 7,664,838 | B2 | 2/2010 | Monga et al. |
| 7,769,887 | B1 | 8/2010 | Bhattacharyya et al. |
| 7,860,469 | B2 | 12/2010 | Mohanty et al. |
| 2002/0001292 | A1* | 1/2002 | Miyamoto ..................... 370/335 |
| 2002/0052790 | A1 | 5/2002 | Tomishima |
| 2002/0095524 | A1 | 7/2002 | Sanghvi et al. |
| 2002/0123356 | A1* | 9/2002 | Michaud et al. .............. 455/457 |
| 2003/0134632 | A1 | 7/2003 | Loughran |
| 2003/0153317 | A1 | 8/2003 | Friman et al. |
| 2004/0009751 | A1 | 1/2004 | Michaelis et al. |
| 2004/0097254 | A1 | 5/2004 | Laroia et al. |
| 2004/0158729 | A1 | 8/2004 | Szor |
| 2004/0172481 | A1* | 9/2004 | Engstrom ..................... 709/239 |
| 2004/0192391 | A1 | 9/2004 | Nagai |
| 2004/0264396 | A1 | 12/2004 | Ginzburg et al. |
| 2005/0149376 | A1 | 7/2005 | Guyan et al. |
| 2006/0155856 | A1 | 7/2006 | Nakashima et al. |
| 2006/0217116 | A1 | 9/2006 | Cassett et al. |
| 2006/0221953 | A1 | 10/2006 | Basso et al. |
| 2007/0174469 | A1 | 7/2007 | Andress et al. |
| 2007/0178876 | A1 | 8/2007 | Yaqub et al. |
| 2007/0201369 | A1 | 8/2007 | Pedersen et al. |
| 2007/0245171 | A1 | 10/2007 | Ohly et al. |
| 2007/0286222 | A1 | 12/2007 | Balasubramanian |
| 2007/0294410 | A1 | 12/2007 | Pandya et al. |
| 2008/0019339 | A1 | 1/2008 | Raju et al. |
| 2008/0183857 | A1 | 7/2008 | Barfield et al. |
| 2008/0234012 | A1 | 9/2008 | Liu et al. |
| 2009/0005127 | A1 | 1/2009 | Frenger et al. |
| 2009/0022095 | A1 | 1/2009 | Spaur et al. |
| 2009/0049518 | A1 | 2/2009 | Roman et al. |
| 2009/0183186 | A1 | 7/2009 | Murtagh |
| 2009/0318124 | A1 | 12/2009 | Haughn |
| 2009/0325512 | A1 | 12/2009 | Granlund et al. |
| 2010/0045422 | A1 | 2/2010 | Teng et al. |
| 2010/0142477 | A1 | 6/2010 | Yokota |
| 2010/0144332 | A1 | 6/2010 | Savoor |
| 2010/0231383 | A1 | 9/2010 | Levine et al. |
| 2010/0279745 | A1 | 11/2010 | Westcott et al. |
| 2010/0285776 | A1 | 11/2010 | De Froment |
| 2010/0287281 | A1 | 11/2010 | Tirpak |
| 2010/0322124 | A1 | 12/2010 | Luoma et al. |
| 2011/0003592 | A1 | 1/2011 | Matsumoto |
| 2011/0019557 | A1 | 1/2011 | Hassan et al. |
| 2011/0028085 | A1 | 2/2011 | Waung et al. |
| 2011/0054879 | A1 | 3/2011 | Bogsanyl et al. |
| 2011/0149797 | A1 | 6/2011 | Taaghol et al. |
| 2011/0182220 | A1 | 7/2011 | Black et al. |
| 2011/0185202 | A1 | 7/2011 | Black et al. |
| 2011/0188394 | A1 | 8/2011 | Seo |
| 2011/0201285 | A1 | 8/2011 | Giaretta et al. |
| 2012/0020266 | A1 | 1/2012 | Sun et al. |
| 2012/0129503 | A1 | 5/2012 | Lindeman et al. |
| 2012/0134361 | A1 | 5/2012 | Wong et al. |
| 2012/0185577 | A1 | 7/2012 | Giaretta et al. |
| 2012/0214527 | A1 | 8/2012 | Meylan et al. |
| 2012/0236772 | A1 | 9/2012 | Kondratiev |
| 2012/0257512 | A1 | 10/2012 | Lim |
| 2012/0270538 | A1 | 10/2012 | Meylan et al. |
| 2013/0053013 | A1 | 2/2013 | Giaretta et al. |
| 2013/0165181 | A1 | 6/2013 | Hasegawa |
| 2013/0217331 | A1 | 8/2013 | Manente |
| 2013/0217357 | A1 | 8/2013 | Menezes et al. |
| 2013/0225100 | A1 | 8/2013 | Chen et al. |
| 2014/0286256 | A1 | 9/2014 | Chowdhury et al. |

FOREIGN PATENT DOCUMENTS

| | | |
|---|---|---|
| JP | 2001339465 A | 12/2001 |
| JP | 2002091841 A | 3/2002 |
| JP | 2004297218 A | 10/2004 |
| JP | 2008048072 A | 2/2008 |
| JP | 2008072568 A | 3/2008 |
| JP | 2008187377 A | 8/2008 |
| JP | 2009021966 A | 1/2009 |
| JP | 2009182443 A | 8/2009 |
| JP | 2009540687 A | 11/2009 |
| JP | 2010074818 A | 4/2010 |
| JP | 2010183414 A | 8/2010 |
| JP | 2011530860 A | 12/2011 |
| JP | 2012529807 A | 11/2012 |
| WO | 03036491 A1 | 5/2003 |
| WO | 2007146549 A2 | 12/2007 |
| WO | 2009096410 A1 | 8/2009 |
| WO | 2010016849 A1 | 2/2010 |
| WO | 2011023096 A1 | 3/2011 |
| WO | 2011146831 A1 | 11/2011 |

OTHER PUBLICATIONS

Andrea Passarella: "Power Management Policies for Mobile Computing", Feb. 1, 2005, pp. 1-151, XP055019616, Retrieved from the Internet: URL:http://cnd.iit.cnr.it/andrea/docs/passarella_phd_thesis.pdf [retrieved-on Feb. 16, 2012] * chapter 5.3, 5.3.1.

Chen L., et al., "QoS aware power efficiency in IEEE 802.11 LAN", Consumer Communications and Networking Conference, 2005. CCNC. 2005 Second IEEE, IEEE, Piscataway, NJ, USA, Jan. 3, 2005, pp. 85-90, XP010787616, DOI: 10.1109/CCNC.2005. 1405149, ISBN: 978-0-7803-8784-3 * chapter III C * figures 3-2.

Hare, et al., "A Network-Assisted System for Energy Efficiency in Mobile Devices," 2011 Thrid International Conference on Communication Systems and Networks, COMSNETS, pp. 1-10, Jan. 2011.

International Search Report and Written Opinion—PCT/US2012/052927—ISA/EPO—Nov. 15, 2012.

Kravets R et al: "Application-Driven Power Management for Mobile Communication" Wireless Networks, ACM, New York, NY, US, vol. 6, No. 4, Sep. 2000, pp. 263-277, XP001036334 ISSN: 1022-0038.

Liu China MOB1 LeYuri Ismai Lov Ericsson Z Cao China Mobile D: "Socket API Extension for MIF Host; draft-liu-mif-api-extension-03.txt", Socket API Extension for MIF Host; draft-liu-mi f-api—Extension-03.Txt, Internet Engineering Task Force, IETF; Standardworkingdraft, Internet Society (ISOC) 4, Rue Des Falaises CH- 1205 Geneva, Switzerland, No. 3, Oct. 25, 2010, pp. 1-8, XP015072273, [retrieved on Oct. 25, 2010] abstract* chapters 3-7 * figure 1.

Liu China Mobile Yuri Ismailov Ericsson Z Cao China Mobile D: "Socket API Extension for MIF Host; draft-liu-mif-api-extension-04.txt", Socket API Extension for MIF Host; draft-liu-mif-api-Extension-04.Txt, Internet Engineering Task Force, IETF; Standardworki NGDraft, Internet Society (ISOC) 4, Rue Des Falaises CH- 1205 Geneva, Switzerland, No. 4, Mar. 15, 2011, pp. 1-9, XP015074974, [ retrieved on Mar. 15, 2011] abstract *chapter 3-5 * figure 1.

Liu H., et al: "TailTheft: Leveraging the Wasted Time for Saving Energy in Cellular Communications", MobiArch '11 Proceedings of the sixth international workshop on MobiArch Jun. 28, 2011, pp. 31-36, XP002676107, ISBN: 978-1-4503-0740-6 Retrieved from the Internet: URL:http://delivery.acm.org/10.1145/2000000/1999925/p31-liu.pdf"145.64.134.245&acc=ACTIVE%20SERVICE&CFID=103451177&CFTOKEN=63558822&_acm_=1337160633_c5b6dc53c6b1c9 77ac53b9dfb0180831 [retrieved on May 16, 2012].

* cited by examiner

SYSTEMS AND METHODS FOR MONITORING OF BACKGROUND APPLICATION EVENTS

CROSS-REFERENCE TO RELATED APPLICATIONS

This application claims priority under 35 U.S.C. §119(e) to U.S. Provisional App. No. 61/543,701, filed Oct. 5, 2011, and to U.S. Provisional App. No. 61/528,628, filed Aug. 29, 2011, both of which are incorporated by reference herein in their entirety.

BACKGROUND

1. Field

The present application relates generally to wireless communications, and more specifically to systems, methods, and devices for monitoring background application events.

2. Background

Applications ("apps") or device applets are now available that operate to provide a wide range of add-on services and features to wireless devices. For example, it is now possible for wireless devices to download and launch device applets to perform value-added functions such as, shopping, searching, position location, driving navigation, and an array of other functions. Network and application providers generally offer these device applets to device users for additional fees. Thus, the use of device applets increases the functionality and usability of wireless devices and offers device users features and convenience not originally available on the devices themselves.

A wireless device interfaces with one or more communication networks using any of a plurality of radios. For example, the wireless device may include a variety of radios providing communications using cellular, Wi-Fi, Bluetooth or other types of radio access technologies. Accordingly, applications executing on the wireless device are provided with a default routing that determines the radio and associated radio channel the applications will use to communicate with the appropriate network.

There is an increased interest, however, in intelligently managing application communications. This is due, in part, to an increase in the number of multi-radio devices (e.g. 3G/Wi-Fi devices) and an increase in network traffic that may create capacity problems for operators. Thus, with respect to such capacity problems, it may be desirable to offload traffic to alternative radios, or to delay communications during certain periods.

Accordingly, there is a need for efficient and cost effective mechanisms to provide communication management for applications on wireless devices. Specifically, there is a need for an efficient way to discover which applications use the network, and how they use it. Further there is a need to classify the discovered applications according to how urgently they should access the radio in various states of the device. Such information may be used to delay the transmission of communications. Moreover, there is a need for systems and methods of communicating policies regarding delayed transmission of communications.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Description" one will understand how the features of this invention provide advantages that include learning which applications are delay-tolerant.

One aspect of the disclosure provides a wireless device. The wireless device includes a network interface configured to exchange data with a communication network. The wireless device further includes an input device configured to receive one or more inputs. The wireless device further includes a processor electrically connected to the network interface. The processor is configured to determine whether the device is in a background state or a foreground state based on the presence or absence of one or more inputs. The processor is further configured to execute a plurality of applications configured to communicate with the communication network via the network interface. The processor is further configured to collect one or more communication statistics, for one or more of the plurality of applications, when the device is in the background state. The processor is further configured to, when the device is in the foreground state, either collect, separately from the communication statistics collected when the device is in the background state, the one or more communication statistics, or refrain from collecting the one or more communication statistics.

Another aspect of the disclosure provides a method of collecting application communication statistics. The method includes determining whether a device is in a foreground state or a background state based on the presence or absence of one or more inputs. The method further includes executing a plurality of applications configured to communicate with a communication network. The method further includes collecting one or more communication statistics, for one or more of the plurality of applications, when the device is in the background state. The method further includes, when the device is in the foreground state, either collecting, separately from the communication statistics collected when the device is in the background state, the one or more communication statistics, or refraining from collecting the one or more communication statistics.

Another aspect of the disclosure provides an apparatus for collecting application communication statistics. The apparatus includes means for determining whether the apparatus is in a foreground state or a background state based on the presence or absence of one or more inputs. The apparatus further includes means for executing a plurality of applications configured to communicate with a communication network. The apparatus further includes means for collecting one or more communication statistics, for one or more of the plurality of applications, when the apparatus is in the background state. The apparatus further includes either means for collecting, separately from the communication statistics collected when the device is in the background state, the one or more communication statistics when the device is in the foreground state or means for refraining from collecting the one or more communication statistics when the device is in the foreground state.

Another aspect of the disclosure provides a non-transitory computer-readable medium. The medium includes code that, when executed, causes an apparatus to determine whether the apparatus is in a foreground state or a background state based on the presence or absence of one or more inputs. The medium further includes code that, when executed, causes the apparatus to execute a plurality of applications configured to communicate with a communication network. The medium further includes code that, when executed, causes the apparatus to collect one or more communication statistics, for one or more of the plurality of applications, when the apparatus is in the background state. The medium further includes code that, when executed, causes the apparatus to, when the apparatus is in the foreground state, either collect, separately from the communication statistics collected when the apparatus is in the background state, the one or more communication statistics, or refrain from collecting the communication statistics.

Another aspect of the disclosure provides a wireless device configured to execute a plurality of applications and communicate with a communication network. The wireless device includes a receiver configured to receive a plurality of rules specifying how one or more of the plurality of applications should communicate with the communication network. The wireless device further includes an input an input device configured to receive one or more inputs. The wireless device further includes a processor configured to determine whether the device is in a foreground state or a background state based on the presence or absence of one or more inputs. The processor is further configured to modify communication by one or more of the plurality of applications in compliance with the rules. The processor is further configured to allow transmission of the communication by one or more of the plurality of applications in accordance with the rules, when the device is in the foreground state.

Another aspect of the disclosure provides a method of communicating with a communication network. The method includes receiving a plurality of rules specifying how one or more of a plurality of applications should communicate with the communication network. The method further includes determining whether the device is in a foreground state or a background state based on the presence or absence of one or more inputs. The method further includes modifying communication by one or more of the plurality of applications in compliance with the rules. The method further includes allowing transmission of the communication by one or more of the plurality of applications, in accordance with the rules, when the user interface is in the foreground state.

Another aspect of the disclosure provides an apparatus for communicating with a communication network. The apparatus includes means for receiving a plurality of rules specifying how one or more of a plurality of applications should communicate with the communication network. The apparatus further includes means for determining whether the device is in a foreground state or a background state based on the presence or absence of one or more inputs. The apparatus further includes means for modifying communication by one or more of the plurality of applications in compliance with the rules. The apparatus further includes means for allowing transmission of the communication by one or more of the plurality of applications, in accordance with the rules, when the user interface is in the foreground state.

Another aspect of the disclosure provides a non-transitory computer-readable medium. The medium includes code that, when executed, causes an apparatus to receive a plurality of rules specifying how one or more of a plurality of applications should communicate with a communication network. The medium further includes code that, when executed, causes the apparatus to determine whether the device is in a foreground state or a background state based on the presence or absence of one or more inputs. The medium further includes code that, when executed, causes the apparatus to modify communication by one or more of the plurality of applications in compliance with the rules. The medium further includes code that, when executed, causes the apparatus to allow transmission of the communication by one or more of the plurality of applications, in accordance with the rules, when the user interface is in the foreground state.

Another aspect of the disclosure provides an apparatus configured to communicate with a communication network. The device includes a processor configured to generate a plurality of rules specifying how one or more of a plurality of applications, executing on a wireless device, should communicate with the communication network. The device further includes a transmitter configured to transmit the plurality of rules, over the communication network, to the wireless device.

Another aspect of the disclosure provides a method of communicating with a communication network. The method includes generating a plurality of rules specifying how one or more of a plurality of applications, executing on a wireless device, should communicate with the communication network. The method further includes transmitting the plurality of rules, over the communication network, to the wireless device.

Another aspect of the disclosure provides an apparatus for communicating with a communication network. The apparatus includes means for generating a plurality of rules specifying how one or more of a plurality of applications, executing on a wireless device, should communicate with the communication network. The apparatus further includes means for transmitting the plurality of rules, over the communication network, to the wireless device.

Another aspect of the disclosure provides a non-transitory computer-readable medium. The medium includes code that, when executed, causes an apparatus to generate a plurality of rules specifying how one or more of a plurality of applications, executing on a wireless device, should communicate with the communication network. The medium further includes code that, when executed, causes the apparatus to transmit the plurality of rules, over the communication network, to the wireless device.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
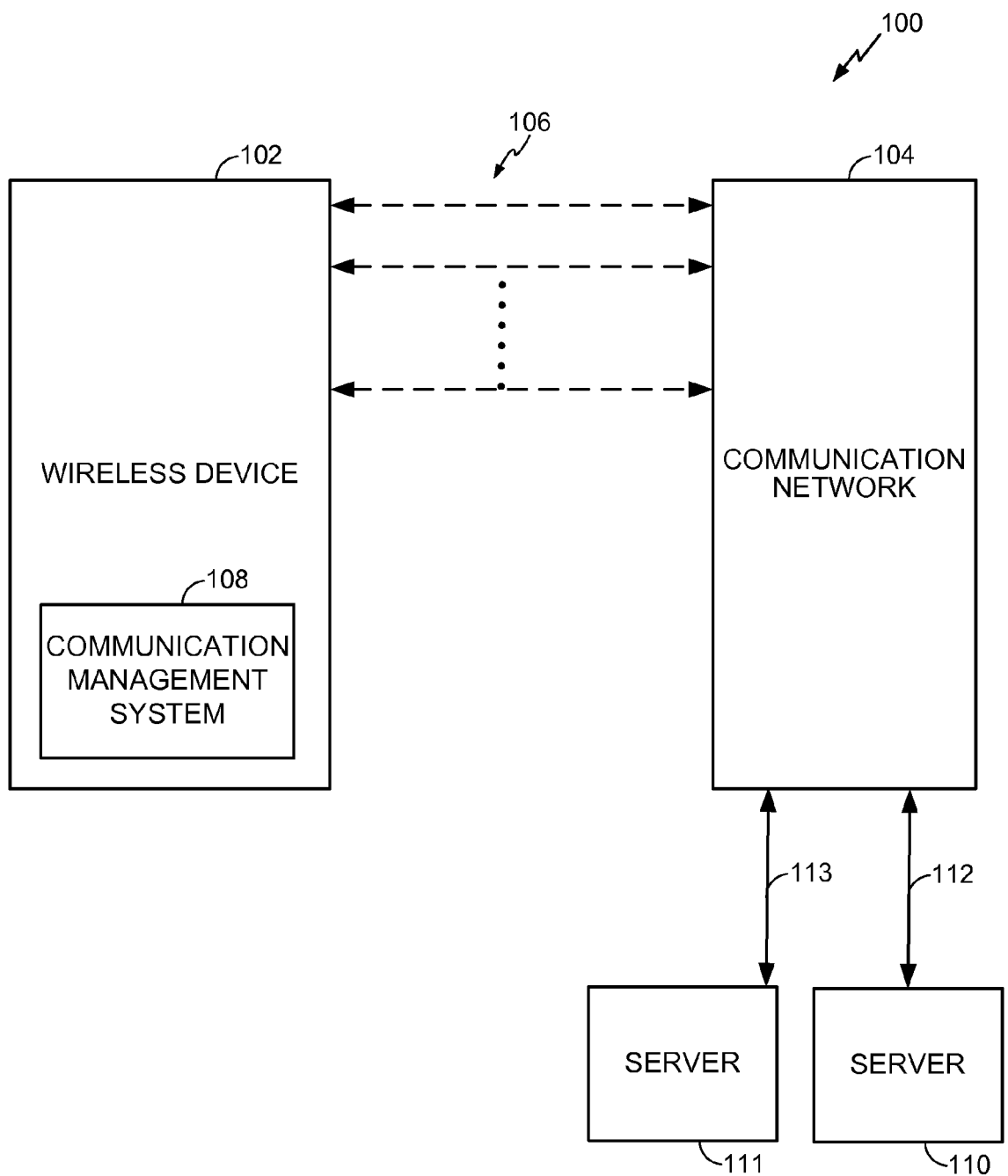
FIG. 1 shows an exemplary network environment illustrating aspects of a communication management system.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.15, IEEE 802.16, IEEE 802.20, Flash-OFDM®, etc. UTRA, E-UTRA, and GSM are part of Universal Mobile Telecommunication management system (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

FIG. 1 shows an exemplary network environment 100 illustrating aspects of a communication management system 108. The network environment 100 includes a wireless device 102, a communication network 104, and one or more servers 110 and 111. The device 102 includes a plurality of radios (not shown) to communicate with the network 104 using corresponding radio channels 106. The device 102 also includes a communication management system 108 that operates to control access to the plurality of radios, for example by a particular application.

The wireless device 102 may communicate with the servers 110 and 111 via the communication network 104. The servers 110 and 111 connect to the communication network 104 via communication channels 112 and 113, respectively. The communication channels 112 and 113 may be either a wired or wireless channel.

During operation, the wireless device 102 executes applications which may interface with the network 104 using any of the plurality of radios. For example, an executing application may issue a networking function call, such as a socket layer call, to request a network resource for communication with the network 104. In an embodiment, the communication management system 108 may process the socket layer call based on a default routing configuration to bind a pre-determined radio resource to the application.

In an embodiment, the server 110 may obtain a communication access policy. In various embodiments, the server 110 may generate the communication access policy based on compiled network statistics, may retrieve a previously compiled communication access policy, or may receive the communication access policy from another source. In an embodiment, the wireless device 102 may collect communication statistics via the communication management system 108. Communication statistics may include, for example, information about applications that attempt to access the radio channels 106, when the applications attempt to access the radio channels 106, what kind of access is attempted, etc. The wireless device 102 may provide the communication statistics to the server 111. One or both of the servers 110 and 111 may process the communication statistics received from the wireless device 102, and may compile communication access policy, either alone or in tandem. In certain embodiments, the server 110 and the server 111 may be collocated, or their functionality can be combined on a single server.

The communication access policy may include rules about which applications are allowed to access the radio channels 106, when the applications are allowed to access the radio channels 106, what kind of access is allowed, etc. The server 110 may provide the communication access policy to the wireless device 102 via the communication network 104. In various embodiments, the server 110 may provide the communication access policy to the wireless device 102 via Access Network Discovery and Selection Function (ANDSF), Open Mobile Alliance Device Management (OMA-DM), and/or any other suitable method, over-the-air or otherwise.

In various implementations, the communication management system 108 operates to intercept the networking function call from the application. The communication management system 108 may select an appropriate radio for use by the application according to the communication access policy. The communication management system 108 may also modify communications of the application according to the communication access policy. As used herein, modification of communications can include, but is not limited to, delaying communications or otherwise impacting or affecting communications. The intelligent radio selection system 108 may also bind the application to a network resource (i.e., the radio that has been selected). Because the communication management system 108 operates in response to the normal operations of the applications when they use a radio resource, the system may operate with both legacy and non-legacy applications without any application changes or upgrades. A more detailed description of the communication management system 108 is provided below.

Figure 2:
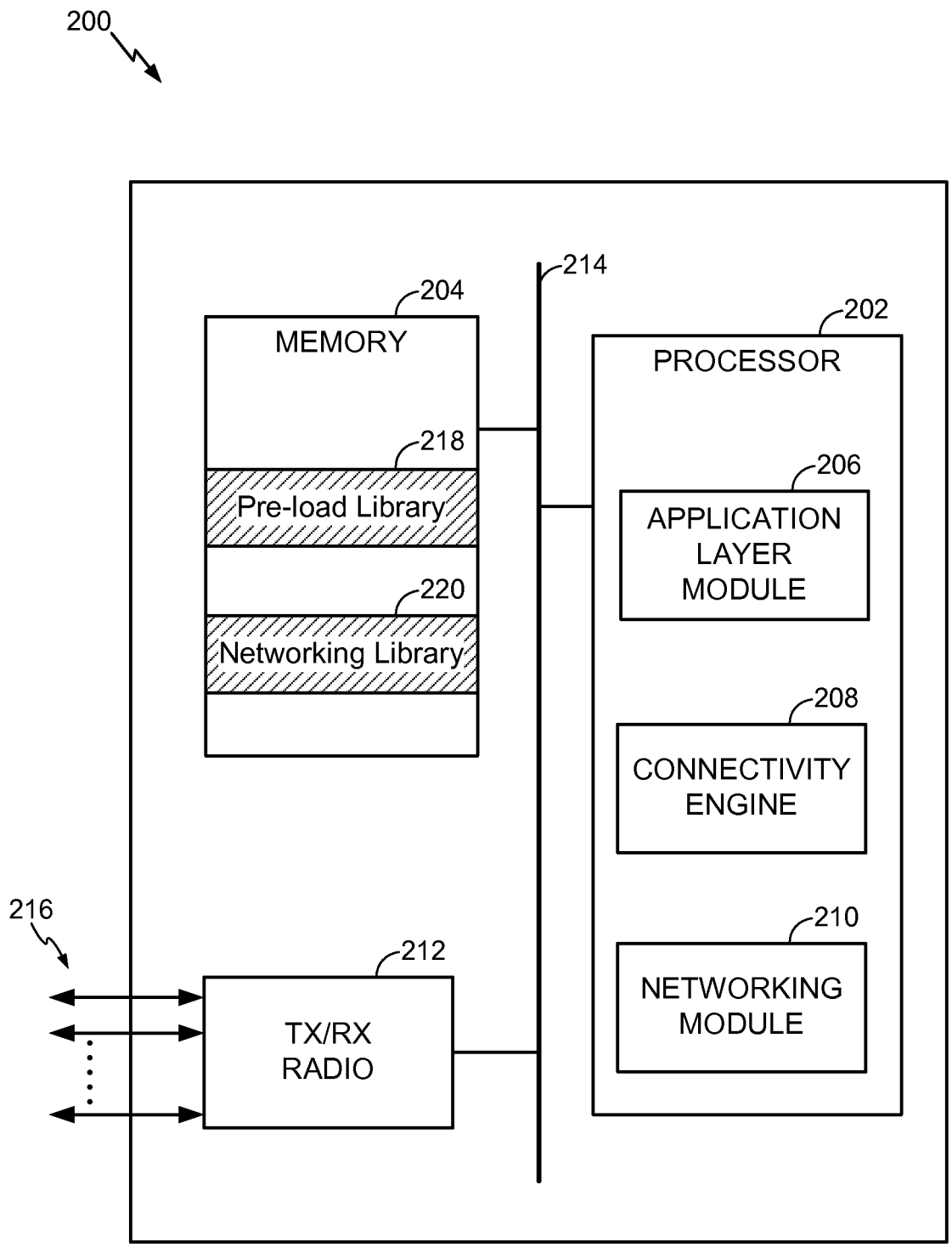
FIG. 2 shows an exemplary wireless device configured to provide communication management.

FIG. 2 shows an exemplary wireless device 200 configured to provide communication management. The device 200 includes a processor 202, a memory 204, and a TX/RX radio 212, all coupled to communicate using a communication bus 214. The wireless device 200 may be the wireless device 102, described above with respect to FIG. 1. It should be noted that the device 200 is just one implementation and that other implementations are possible.

In one aspect, the processor 202 includes an application layer module 206, a connectivity engine 208, and a networking module 210. The processor 202 may also include at least one of a CPU, microprocessor, gate array, hardware logic, memory elements, and/or hardware executing software (not shown). The processor 202 is configured to control the operation of the device 200 such that communications of applications executing on the device 200 may be selectively modified, impacted, delayed and/or bound to a desired radio. In one implementation, the processor 202 is configured to execute computer-readable instructions related to performing any of a plurality of functions. For example, the processor 202 operates to analyze information received or communicated from the device 200 to effectuate communication management. In another aspect, the processor 202 operates to generate information that may be utilized by the memory 204, the application layer module 206, the TX/RX radio 212, and/or connectivity engine 208 to effectuate communication management.

The TX/RX radio 212 includes hardware and/or a processor executing software that is configured to provide a plurality of radios/interfaces that may be used to interface the device 200 with a plurality of external entities, such as the external communication network 104 (FIG. 1) using a plurality of radio channels 216. The radio channels 216 may be, for example, the radio channels 106 described above with respect to FIG. 1. The TX/RX radio 212 may provide radios/interfaces to communicate using cellular, Wi-Fi, Bluetooth, or any other technologies to communicate with communication networks using the radio channels 216.

The application layer module 206 includes hardware and/or a processor executing software that is configured to execute one or more applications on the device 200 and to store the applications in the memory 204. In one implementation, the application layer module 206 is configured to allow applications to initiate networking function calls to the networking module 210 to request networking services. The networking function calls may include a connection request to a radio/interface at the TX/RX radio 212 for the purpose of communicating with an external network or system via the radio channels 216.

Figure 8:
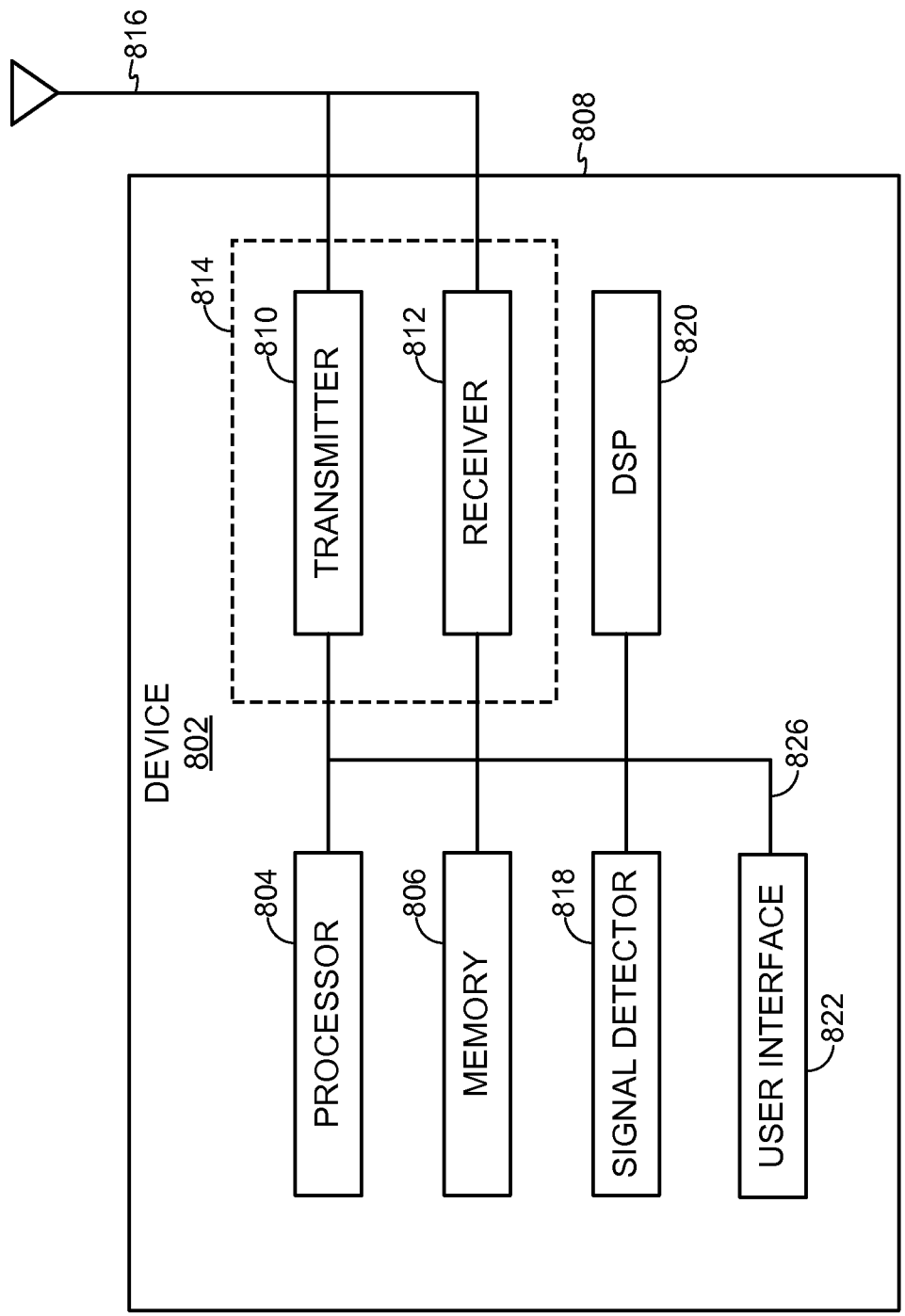
FIG. 8 shows an exemplary device configured to implement a communication access policy.

The networking module 210 includes hardware and/or a processor executing software that is configured to perform networking functions. In one implementation, the networking functions include such functions as Connect( ), Bind( ), Write( ), and Setsockopt( ). The connect( ) function operates to establish a connection between an application and a particular radio/interface. The write( ) function operates to send data over the connection. For example, a particular radio/interface may be selected from the plurality of candidate radios provided by the TX/RX radio 212. In an aspect, networking module 210 is configured to perform a variety of networking functions or commands. In one aspect, the networking module 210 may allow certain functions to proceed, and may not allow other functions to proceed, while a device is in a background mode (FIG. 8). In one embodiment, the device can be in a background mode, for example, when a user interface is not in use.

The connectivity engine 208 includes hardware and/or a processor executing software that is configured to assess system resources to manage communication from applications. In various implementations, the connectivity engine 208 is configured to intercept application communication, selectively modify, impact, and/or delay the communication, and/or select a particular radio based on one or more of the following selection criteria.

1. User Policy—policy set by the device user regarding radio access by applications executing at the device.
2. Operator Policy—policy set by network operators regarding network access by devices or applications.
3. Radio metrics—measurements of radio performance or other types of measurements that are used to select the most preferred radio for a particular application or operating environment.
4. Application requirements—requirements associated with requesting applications, such as bandwidth requirements or latency/performance requirements.
5. Network usability—information regarding the availability of a particular network on a particular radio interface.
6. Vendor Supplied Metrics—information to translate from radio metrics such as Receive Signal Strength Indication and Packet Loss Rate to the throughput and latency available for a particular radio interface.
7. Access Point Availability—information specifying the unique identifier for access points congested by the traffic from other devices or those that may configure a radio link but do not forward packets to the network.

The processor 202 may download one or more of the aforementioned selection criteria via the TX/RX radio 212. The selection criteria may be stored in the memory 204. For example, the processor 202 may retrieve the operator policy and the connectivity engine 208 may apply the operator policy. The operator policy may include a plurality of rules regulating network access by applications on the wireless device 200.

The memory 204 includes RAM, ROM, EEPROM or any other type of memory device that operates to allow the applications and/or the selection criteria to be stored and retrieved at the device 200. In one implementation, the memory 204 is configured to store computer-readable instructions executed by processor 202. The memory 204 may also be configured to store any of a plurality of other types of data including data generated by any of the processor 202, TX/RX radio 212, application layer module 206, networking module 210, and/or connectivity engine 208. The memory 204 may be configured in a number of different configurations, including as random access memory, battery-backed memory, hard disk, magnetic tape, etc. Various features may also be implemented upon memory 204, such as compression and automatic back up.

The memory 204 is configured to store a pre-load library 218 and a networking library 220. The pre-load library 218 intercepts socket calls from applications. The networking library 220 provides the networking API used by applications to create and connect sockets to establish network communications.

The connectivity engine 208 is configured to selectively modify, impact, and/or delay application communication in various ways. For example, the connectivity engine 208 may be configured to delay communication using one or more of the above selection criteria. For example, the connectivity engine 208 may delay only communication from delay-tolerant applications. Moreover, the connectivity engine 208 may delay communication only when the wireless device 200 is in a background state. In an embodiment, the connectivity engine 208 delays communication for delay-tolerant applications until the wireless device 200 enters a foreground state. In another embodiment, the connectivity engine 208 delays communication for delay-tolerant applications until a delay-intolerant application initiates communication.

The connectivity engine 208 may also be configured to select a radio from the plurality of candidate radios in various ways. For example, the connectivity engine 208 may be configured to select a radio using one or more of the above selection criteria. Once a radio is selected, the connectivity engine 208 binds the application to the interface representing that radio. For example, in one implementation, the connectivity engine 208 binds the application to the radio's interface by calling into the original networking library 220. Thus, functions at the connectivity engine 208 and the pre-load library 218 may easily access functions, such as a bind( ) function, in the networking library 220 to bind to the radio that has been selected for the application.

In various implementations, the communication management system includes a computer program product having one or more program instructions ("instructions") or sets of "codes" stored or embodied on a computer-readable medium. When the codes are executed by at least one processor, for instance, processor 202, their execution causes the processor 202 to control the device 200 to provide the functions of the intelligent interface selection system described herein. For example, the computer-readable medium includes a floppy disk, CDROM, memory card, FLASH memory device, RAM, ROM, or any other type of memory device or computer-readable medium that interfaces to the device 200. In another aspect, the sets of codes may be downloaded into the device 200 from an external device or communication network resource. The sets of codes, when executed, operate to provide aspects of the intelligent interface selection system described herein.

Figure 3:
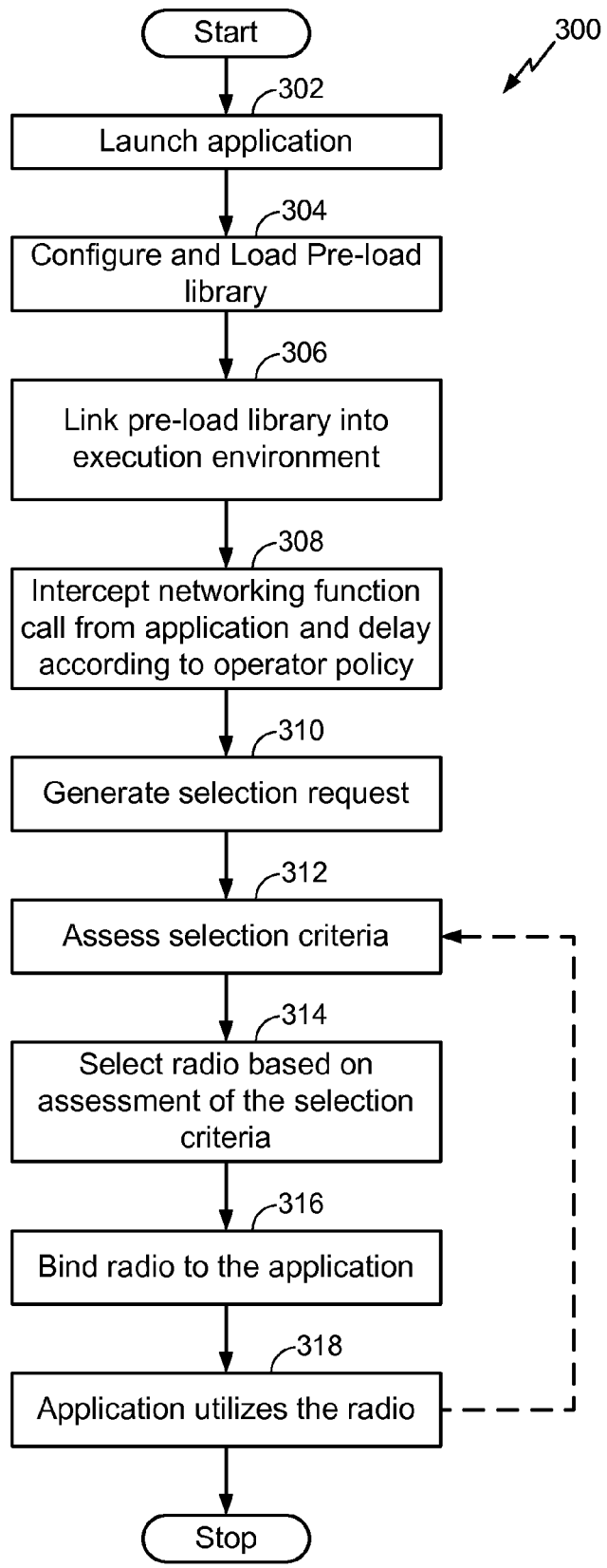
FIG. 3 shows a flowchart of an exemplary method of providing communication management.

FIG. 3 shows a flowchart 300 of an exemplary method of providing communication management. For clarity, the flowchart 300 is described below with reference to the device 200 shown in FIG. 2. However, a person having ordinary skill in the art will appreciate that the illustrated method can be implemented with any suitable device. In one implementation, the processor 202 executes one or more sets of codes to control the functional elements of the device 200 to perform the functions described below.

At block 302, the processor 202 launches an application. The application may be a legacy or non-legacy application that is part of the application layer module 206. For example, the application may be a network browser that generates a networking function call to connect to a wireless network using a radio available at the TX/RX radio 212.

At block 304, the processor 202 configures and loads a pre-load library. For example, the pre-load library 218 includes a subset of the networking functions that are provided in the networking library 220 used by applications to assess communication networks. The networking functions in the pre-load library 218 are configured to intercept networking function calls from applications executing at a device. For example, the pre-load library 218 includes POSIX socket functions that may be used to intercept socket calls by applications executing at the device 200. In one implementation, the pre-load library 218 in stored in memory 204.

In one implementation, the pre-load library 218 functions are configured to receive arguments passed from calling applications and use these arguments to generate a request to the connectivity engine 208 to select the radio best suited for the application's purpose.

At block 306, the processor 202 links the pre-load library into the execution environment. For example, the processor 202 links the pre-load library 218 into the execution environment at a higher priority than the networking library 220. Thus, networking functions calls by applications will be intercepted and processed by functions in the pre-load library 218 and not processed by similar functions in the networking library 220.

At block 308, the processor 202 intercepts a networking function call from the application. For example, the networking function call may be a POSIX socket function call, such as the connect( ) function or the write( ) function. The application generates the networking function call to connect to a radio to allow communication with external networks. Due to the linking of the pre-load library 218 into the execution environment at a higher priority than the networking library 220, the processor 202 intercepts (or processes) the networking function call via the functions in the pre-load library 218. In an embodiment, the processor 202 can delay the networking function call in accordance with the received operator policy, as discussed below with respect to FIG. 12.

At block 310, the called function in the pre-load library 218 generates a selection request to the connectivity engine 208 to select the appropriate radio for use by the application. The request includes any information that is part of the selection criteria used by the connectivity engine 208 to select the appropriate radio for use by the application. In another embodiment, the called function in the pre-load library 218 generates a selection request to the connectivity engine 208 to determine whether the communication should be delayed.

At block 312, selection criteria are assessed. In one implementation, the connectivity engine 208 operates to assess the selection criteria described above. For example, the connectivity engine 208 may communicate with the processor 202 to assess Operator Policies that are part of the selection criteria.

At block 314, the connectivity engine 208 selects a radio based on the assessment of the selection criteria. For example, the connectivity engine 208 operates to select the radio that best matches the selection criteria.

At block 316, the connectivity engine 208 binds to the radio's interface that has been selected for the application. For example, in one implementation, the connectivity engine 208 calls a bind( ) function of the networking library 220 to bind to the radio that has been selected for the application. For example, the connectivity engine 208 is aware of the networking library 220 and how to access its functions directly without being intercepted by the pre-load library 218. In an embodiment, the connectivity engine 208 delays communication prior or post to binding the application to the radio.

At block 318, the application then utilizes the radio that has been selected for network communications.

In an optional operation, the method proceeds to block 312 where the connectivity engine 208 operates to perform periodic assessment of the selection criteria to determine if the current radio best matches the selection criteria. If the connectivity engine 208 determines after another assessment of the selection criteria that a radio other than the current radio best matches the selection criteria, then the connectivity engine 208 may destroy the connection as a means to trigger the application into restarting the connection to select a different radio for the new connection. Thus, the optional operation allows the selection criteria to be periodically assessed to assure that the most appropriate radio is selected to conduct the desired communication.

Therefore, the flowchart 300 provides communication management for use with legacy and non-legacy applications. It should be noted that the flowchart 300 is just one implementation and that the operations of the flowchart 300 may be rearranged or otherwise modified such that other implementations are possible.

Connectivity Management for Wireless Device Applications

In wireless devices such as smart phones, personal digital assistants, etc., software applications may continue to operate even though the device is in the background state (for example, when a user is not actively using the device). Applications such as social networking applications, email or other communication applications, data feeds, etc. (popular examples include Facebook®, Gmail®, Twitter®, etc.) may continue to send and receive data even though a user is not using the device.

A mobile device may be in background mode when certain inputs of the device are not operational or are in a sleep state. In other words, the device may be in background mode when a user is not using the device. For example, when audio inputs (such as a microphone) are off, the device may be considered to be in a background mode. In addition, when visual inputs (such as a display of the device) are off, the device may be determined to be in a background mode. Additional inputs may be used to determine whether or not the mobile device is in a background mode, as will be described below.

Figure 4:
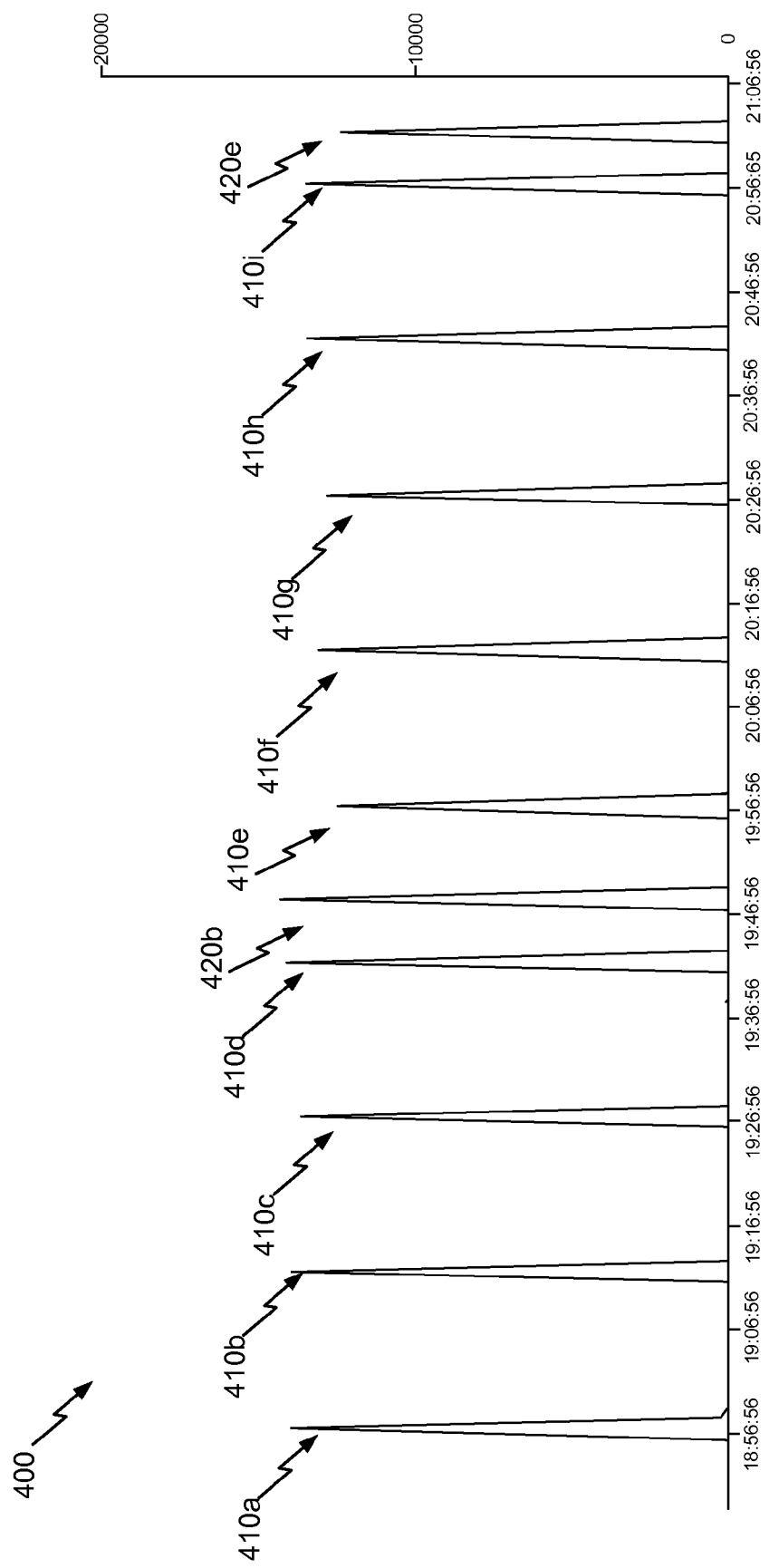
FIG. 4 shows a graph of application network activity for an exemplary device.

FIG. 4 shows a graph 400 of application network activity for an exemplary device. The x-axis of the graph 400 shows time, and the y-axis shows an amount of data transferred, in bytes, at each time. The graph 400 shows network activity during an approximately two-hour period, during which the device is in an idle mode. In an embodiment, the device is in an idle mode when a user does not interact with the device and/or a display is off. Although the device is in the background mode, applications that continue to operate create spikes in activity, for example, spikes 410a-i. Such applications can be referred to as "background" applications. The activity by these applications may utilize communication resources such as the radios in radio 212, etc. In an embodiment, the background mode can be an "idle" mode.

Network activity spikes, such as spikes 410a-i, may cause the wireless device to transition from the idle mode to a connected mode. In the connected mode, the device may power-up a radio, may generate signaling traffic, and may consume a greater amount of power than when in the idle mode. In some cases, the spikes may prevent the wireless device from transitioning from the connected mode to the idle mode, or to alternate connection modes such as a discontinuous reception (DRX) mode. Such elevated levels of radio activity by the applications when the user is not actively engaging the device may result in shortened battery life, increased load of radio networks, or other undesired effects.

Employing the techniques and structures disclosed herein, a device may employ a software layer (also referred to as a "wrapper") that provides an application program interface (API) to capture data from background applications and hold them until a desired point where radio resources may be activated and the application data transferred and tasks executed in a synchronized manner. By aggregating such tasks/data requests, frequent waking of the wireless device may be reduced and other communication resources conserved during periods where the user is not actively engaging with the device.

Figure 5:
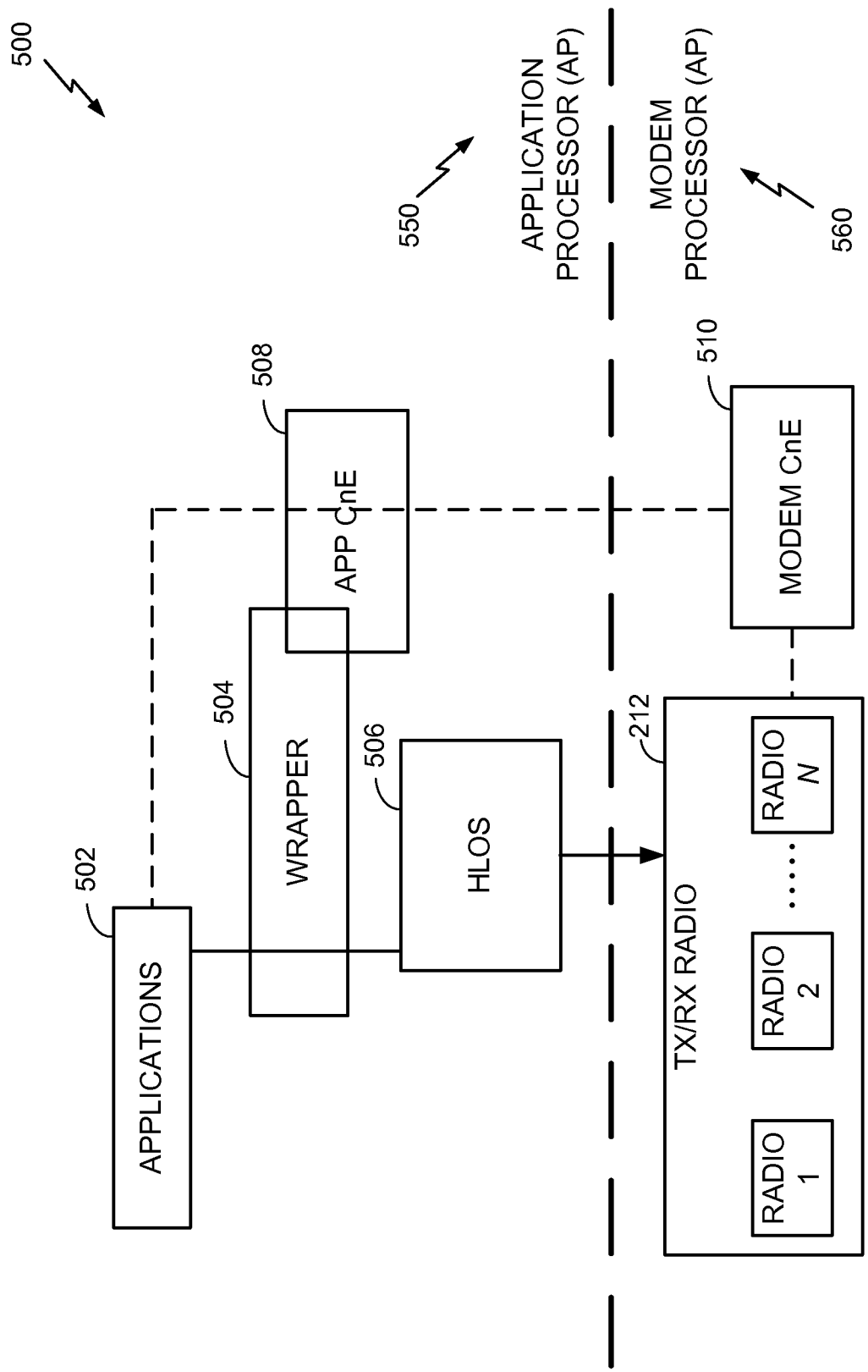
FIG. 5 shows an exemplary block diagram of a hardware/software system configured to aggregate application communication.

FIG. 5 shows an exemplary block diagram of a hardware/software system 500 configured to aggregate application communication. As shown, the software components are divided between an application processor 550 and a modem processor 560, but the various functionalities may be organized differently from the example of FIG. 5. For example, functions described as software may be implemented in hardware and vice versa, functions may be distributed differently between components, etc. In an embodiment, the hardware/software system 500 may be the communication management system 108, discussed above with respect to FIG. 1. In another embodiment, the hardware software system 500 may be implemented on the wireless device 200, described above with respect to FIG. 2. For example, functions of the application processor 550 may be implemented by one or more of the processor 202, the application layer module 206, and/or the connectivity engine 208. Functions of the modem processor 560 may be implemented by one or more of the TX/RX radio 212, the networking module 210, and/or the connectivity engine 208.

In the illustrated embodiment, applications 502 interact with an application connection engine 508 and with a high level operating system (HLOS) 506. The HLOS 506 may be, for example, the Android operating system produced by Google Inc., Mountain View, Calif. The application connection engine 508 may communicate with a modem connection engine 510. The modem connection engine may manage communication resources such as a radio 212 and the radios therein. The wrapper 504 is capable of capturing data between the applications 502 and the HLOS 506. The wrapper 504 may aggregate data from the applications 502 during a period of user inactivity and hold them until a determined time before releasing them to the HLOS 506 and ultimately the radio 212 for operation/transmission. The wrapper 504 may be invisible to the applications 502 such that they are unaware that their data/requests are being held/aggregated. In an embodiment, the wrapper 504 may emulate functions of the HLOS 506. The wrapper 504 may be a separate component or may be incorporated into another component such as the application connection engine 508. For example, the wrapper 504 may be implemented by the connectivity engine 208, described above with respect to FIG. 2.

Figure 6:
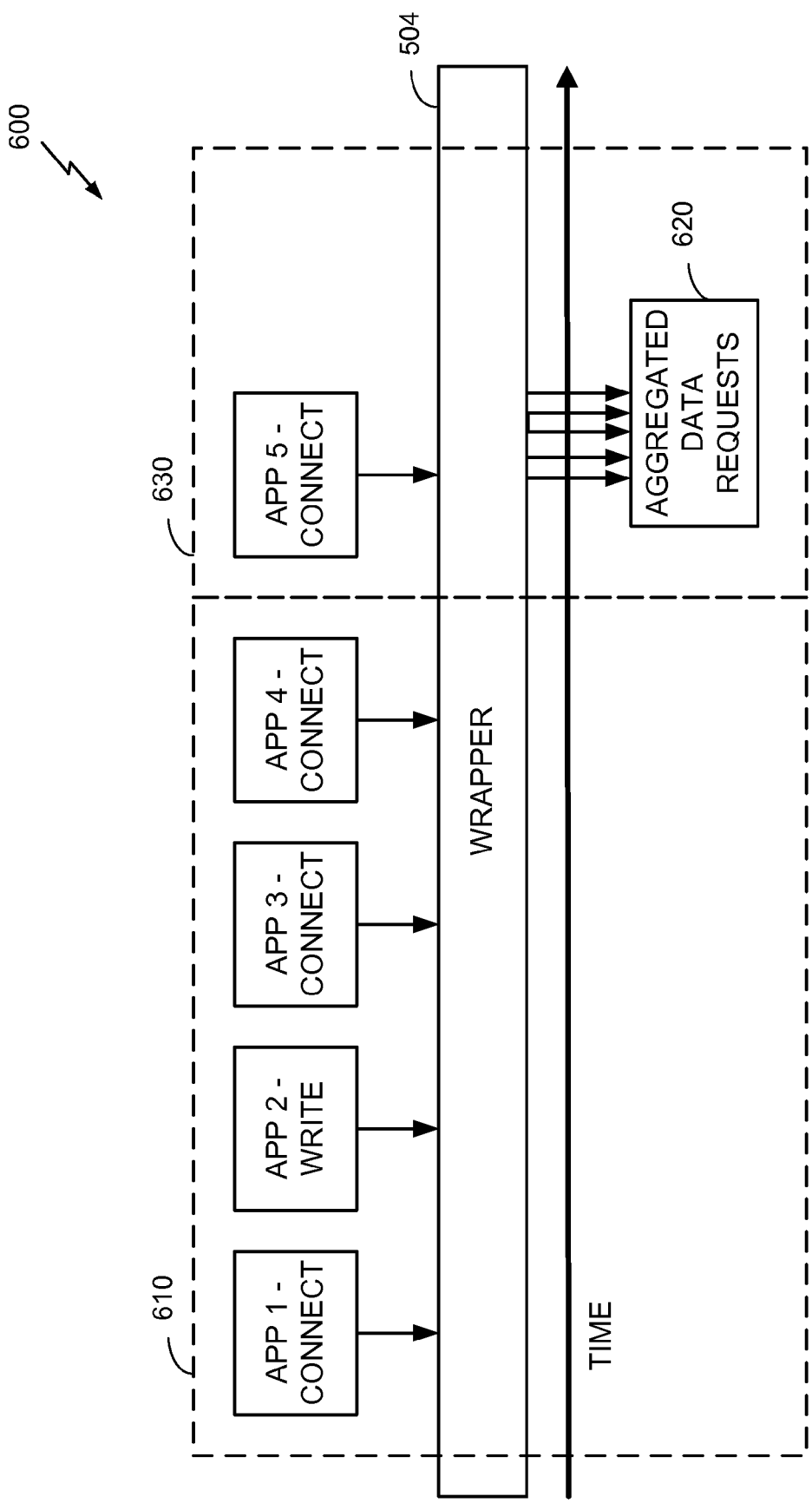
FIG. 6 shows an exemplary timeline of application communication aggregation implemented by the hardware/software system of FIG. 5.

FIG. 6 shows an exemplary timeline 600 of application communication aggregation implemented by the hardware/software system 500 of FIG. 5. As shown, applications APP 1-4 each initiate a request for use of a radio resource in succession during an aggregation period 610. In an embodiment, application communication may be delayed during the aggregation period 610. In an embodiment, the aggregation period 610 can include a period in which the device 200 is in the idle mode. The applications APP 1-4 may be delay-tolerant applications. Delay-tolerant applications may carry relatively time-insensitive data such as, for example, e-mail or a bulk file transfer.

In the illustrated embodiment, the application APP 1 makes a connect( ) request. Then, the application APP 2 makes a write( ) request. Next, the application APP 3 makes a connect( ) request. Finally, the application APP 4 makes a connect( ) request. The wrapper 504 receives the connect( ) and write( ) socket calls. Instead of acting on the socket calls immediately, the wrapper 504 delays the communication during the aggregation period 610. At a determined time, the wrapper 504 releases the socket calls together, as aggregated data requests 620.

In an embodiment, the wrapper 504 may release the aggregated data requests 620 during a transmit window 630. In various embodiments, the transmit window 630 may include a period in which the device 200 is in the idle mode, and may include a period in which the device 200 is in the active mode. During the transmit window 630, the wrapper 504 may release aggregated data requests 620 from APPs 1-4. The wrapper 504 may also allow application communications requests made during the transmit window 630 to proceed without delay. In other words, during the transmit window 630, the wrapper 504 may not delay further communication. For example, in the illustrated embodiment, APP 5 initiates a connect( ) request during the transmit window 630. The wrapper 504 allows the connect( ) request of APP 5 to proceed without delay.

In an embodiment, wrapper 504 may open the transmit window 630 at regular or intermittent intervals. For example, the wrapper 504 may open transmit window 630, once every 5 minutes, 10 minutes, 15 minutes, 30 minutes, 60 minutes, etc. In another example, the wrapper 504 may release delayed application communications at a random or pseudo-random time. The intervals at which the wrapper 504 opens the transmit window 630 may be determined by the device 200 or received from another device, such as the server 110 (FIG. 1).

In an embodiment, the wrapper 504 can determine when to open the transmit window 630 dynamically, based on the aggregated data requests 620. For example, the wrapper 504 can open the transmit window 630 when the number of aggregated data requests 620 surpasses a threshold. The threshold can be determined by the device 200 or received from another device, such as the server 110.

The wrapper 504 can keep the transmit window 630 open for a predetermined or dynamic period of time. For example, the wrapper 504 may keep the transmit window 630 open for 15 seconds, 30 seconds, 1 minute, 5 minutes, etc., after the transmit window 630 is opened. As another example, the wrapper 504 may keep the transmit window 630 open for 15 seconds, 30 seconds, 1 minute, 5 minutes, etc., after the last application communication is transmitted. The amount of time which the wrapper 504 keeps the transmit window 630 open may be determined by the device 200 or received from another device, such as the server 110.

In an embodiment, the wrapper 504 may open the transmit window 630 when a delay-intolerant application initiates communication. For example, APP 5 may be a delay-intolerant application. Accordingly, the wrapper 504 may open the transmit window 630 when the connect( ) request is received from APP 4. The wrapper 504 may allow the connect( ) request from APP 4 to proceed, and may also release the aggregated data requests 620 from the APPs 1-4.

Figure 7:
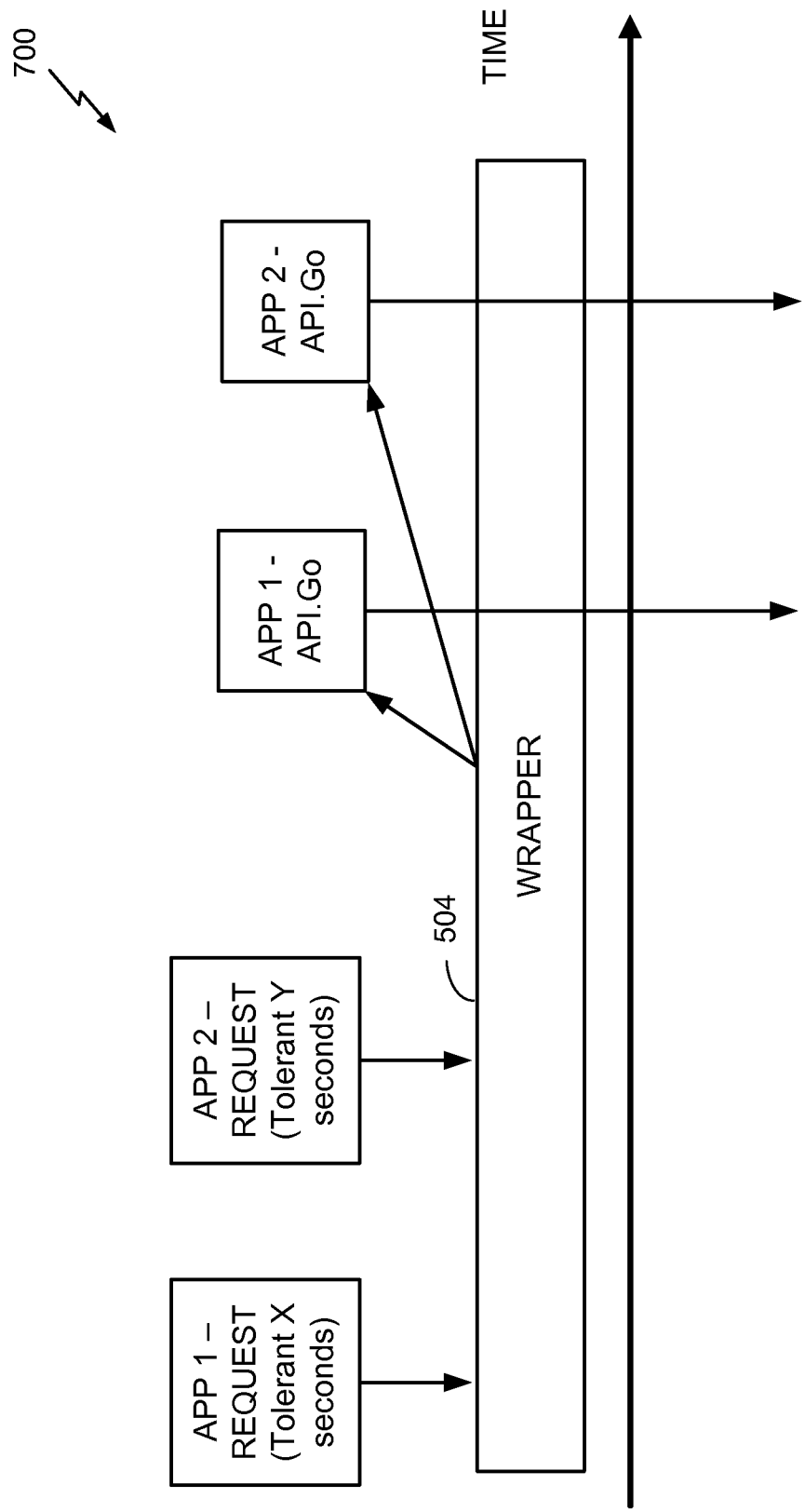
FIG. 7 shows a timeline of application communication aggregations, according to another embodiment.

FIG. 7 shows a timeline 700 of application communication aggregations, according to another embodiment. As shown, applications APP 1-2 each initiate a request for use of a radio resource in succession. The applications APP 1-2 may indicate their delay tolerance via a connection engine API. For example, the application APP 1-2 may include background activity and/or requirements for operation that are only tolerant of specific delays. For example, the applications APP 1-2 may be location tracking applications that report the location of the device 200 periodically, such as every 10 seconds.

As shown, the application APP 1 initiates a communication request, and indicates to the wrapper 504 that it will only tolerate an X-second delay. Next, the application APP 2 initiates a communication request, and indicates to the wrapper 504 that it will only tolerate a Y-second delay. The wrapper 504 may provide a callback function (e.g., API.Go), which may indicate to an application that communication is allowed. After receiving the callback, the application may proceed with communication.

As shown, the wrapper 504 provides the API.Go callback to the application APP 1 before the X-second delay has elapsed. The application APP 1 then communicates through the wrapper 504, without further delay. Similarly, the wrapper 504 provides the API.Go callback to the application APP 2 before the Y-second delay has elapsed. The application APP 2 then communicates through the wrapper 504, without further delay.

In an alternative embodiment, applications may provide the wrapper 504 with specific transmission deadlines via the API. The wrapper 504 may transparently delay communication from the applications, within the constraints of the provided deadlines. Accordingly, the wrapper 504 will allow the application communication to proceed prior to any deadlines.

In yet another aspect, the API may allow also an application to register as a delay-intolerant application. Applications that may request immediate access include child tracking applications, emergency notification applications, etc. In an embodiment, the wrapper 504 may learn the delay tolerance of various applications by monitoring the application communications. In another embodiment, the wrapper 504 may receive a list of application delay tolerances from a list or database, either stored locally on the device 102 or received from the server 110. The list or database may be received along with a communication access policy such as the operator policy.

The wrapper 504 may aggregate or delay application communications in a manner that reduces user disruption. The wrapper 504 may analyze a variety of factors to determine when to delay or aggregate application communication. For example, the wrapper 504 may delay application communication based on characteristics of the wireless device 102 such as a display state (on or off), an audio state (on or off), etc. The wrapper 504 may only delay application communications known to be tolerant of delay. The wrapper 504 may delay application communication when the radio is not loaded, when the wireless device is not otherwise in use (e.g., no phone calls, audio streaming, etc.). A person having ordinary skill in the art would appreciate that the wrapper 504 may determine when to delay application communication based on any combination of the above factors, in addition to other suitable factors.

Moreover, the wrapper 504 may analyze a variety of factors to determine when to release delayed or aggregated communication and to permit unrestricted application communication. For example, a delay-intolerant application (such as, for example, an emergency notification application) may initiate an unrestricted application communication. The unrestricted application communication may trigger the wrapper 504 to release previously delayed or aggregated application communications. Accordingly, previously delayed application communications may use radio resources in conjunction with the emergency application. In other words, the wrapper 504 may open a transmit window for all applications when a delay-intolerant application communication is initiated.

In an embodiment, the wrapper 504 may release delayed or aggregated application communications when a specific radio is activated or selected as a default. The specific radio may include, for example, a Wi-Fi radio, a cellular radio, a particular mode of the cellular radio (e.g. 2G or 3 G communication modes), a Bluetooth radio, etc. For example, the wrapper 504 may delay application communications when only a cellular radio is enabled, and may release the delayed application communications when a Wi-Fi radio is enabled.

In another embodiment, the wrapper 504 may release delayed or aggregated application communications when a radio channel quality is above a threshold. Radio channel quality may include metrics such as signal strength, signal-to-noise ratio (SNR), etc. For example, the wrapper 504 may delay application communications when the SNR of a cellular radio is below a threshold, and may release the delayed application communications when the SNR of the cellular radio rises to or above the threshold.

In another embodiment, the wrapper 504 may release delayed or aggregated application communications periodically or in non-continuous windows. For example, the wrapper 504 may release delayed application communications every 15 minutes. In another example, the wrapper 504 may release delayed application communications at a random or pseudo-random time every 15 to 20 minutes.

In an embodiment, the wrapper 504 releases delayed or aggregated application communications when user interaction is received. For example, the wrapper 504 may release delayed application communications when a display is activated, a button press is detected, etc. In another embodiment, the wireless device 102 may anticipate user interaction. For example, the wireless device 102 may include an accelerometer that may detect movement of the wireless device 102. The wrapper 504 may release delayed application communications when accelerometer output indicates a likelihood of imminent user interaction. In another example, the wireless device 102 may anticipate user interaction via a proximity detector. A person having ordinary skill in the art will appreciate that the wrapper 504 may release delayed application communications in response to any combination of the above, and additionally in response to any other suitable event.

Although the preceding description discusses application communication aggregation and delay with respect to an API, the concepts equally apply in hardware, firmware, or any combination of hardware and software.

Synchronization Policies

In an embodiment, the communication management system 108 (FIG. 1) may receive a communication access policy from the server 110. The communication access policy may include the operator policy used by the connectivity engine 208 (FIG. 2) when delaying and releasing application communications during the aggregation period 610 (FIG. 6) and the transmit window 630, respectively. In various embodiments, the communication access policy can include one or more of: timing information indicating how long application communication may be delayed during the aggregation period 610, a list of applications for which communication may be delayed (an "inclusion list"), a list of applications for which communication may not be delayed (an "exclusion list"), a list of communication types for which communication may or may not be delayed, a list of network conditions during which communication may or may not be delayed, a list of events or triggers for which the wrapper 504 should open or close the transmit window 630, an indication of times during which communication may or may not be delayed, an indication of locations in which communications may or may not be delayed, how often the device 200 should request an update communication access policy from the server 110, a list of radio access technologies (RATs) in which communications may be delayed, etc.

In an embodiment, communication types can include one or more socket operations such as, for example, bind( ), connect( ), accept( ), send( ), recv( ), write( ), read( ), sendto( ), recyfrom( ), close( ), gethostbyname( ), and gethostbyaddr( ). Communication types can further include classifications of traffic types such as, for example, conversational traffic, best effort traffic, and emergency traffic. Conversational traffic can include communication representing intermittent one or two-way communication and/or interactive content such as, for example, text chat traffic, voice chat traffic, video chat traffic, World Wide Web traffic (e.g., mapping and navigation functions), etc. Best effort traffic can include relatively low-priority and/or non-interactive traffic such as, for example, bulk data transfers (e.g., File Transfer Protocol (FTP) traffic), e-mail, video pre-loading, etc. Emergency communication can include relatively high-priority traffic such as, for example, child-tracking position data, time-sensitive alert traffic, emergency voice traffic, etc. Moreover, communication types can be based on information typically contained in an IP header such as, for example, source IP address, destination IP address, source port, destination port, etc.

In an embodiment, the communication access policy can include a synchronization frequency indicating how often the wrapper 540 should open the transmit window 630 in the absence of a transmit trigger or event. For example, the communication access policy may indicate that the wrapper 540 should open the transmit window 630 at least every 5 minutes, 10 minutes, 15 minutes, 30 minutes, 60 minutes, etc. In an embodiment, the communication access policy can include a threshold amount of aggregated data requests over which the wrapper 504 should open the transmit window 630. For example, communication access policy may indicate that the wrapper 540 should open the transmit window 630 when the amount of aggregated data requests 620 is sufficient to occupy the radio 212 for a threshold amount of time. As another example, the wrapper can open the gate if the number of applications, for which communications are delayed, is greater than a threshold. In an embodiment, the communication access policy can include the threshold. As another example, the wrapper can open the gate if the number of socket calls, for which communications are delayed, is greater than a threshold. In an embodiment, the communication access policy can include the threshold.

In an embodiment, the communication access policy can include a list of application delay tolerances from the server 110. The list of application delay tolerances may include a list of delay-intolerant applications, which may be referred to as an "exclusion list." The wrapper 504 (FIG. 5) may exclude applications identified in the exclusion list from aggregation. Similarly, the list of application delay tolerances may include a list of delay-tolerant applications, which may be referred to as an "inclusion list." The wrapper 504 may include applications identified in the inclusion list when aggregating application communications.

In an embodiment, the wrapper 504 may exclude applications by default, and may only delay application communications for applications specifically identified in the inclusion list. The inclusion list may include an application identifier such as, for example, a string representing an application name, a numerical identifier, a version number, an author identification, or any combination thereof. In an embodiment, the inclusion and/or exclusion lists can identify application communications on a granularity including communication types represented by individual socket operations. For example, the inclusion list may identify connect( ) operations from an application "Application A" as a delay-tolerant socket operation. Accordingly, the wrapper 504 may aggregate connect( ) operations from "Application A", but may not aggregate, for example, write( ) operations from "Application A". On the other hand, the wrapper 504 may not aggregate connect( ) operations from "Application B", but may aggregate, for example, write( ) operations from "Application B". A person having ordinary skill in the art will appreciate that the lists can include other combinations of application identifiers, socket operations, and the like.

In an embodiment, the communication access policy includes an indication of network conditions during which communication may or may not be delayed. For example, the communication access policy can include a threshold amount of radio traffic, based on which the wrapper 504 will adjust the aggregation period 610 and/or the transmit window 630. In an embodiment, the wrapper 504 can open the transmit window 630 when an amount of network traffic drops below a threshold specified in the communication access policy.

In an embodiment, the communication access policy includes a list of events or triggers for which the wrapper 504 should open or close the transmit window 630. For example, the communication access policy may indicate that the wrapper 504 should open the transmit window 630 when an application and/or socket call not on the inclusion list attempts to transfer data. As another example, the communication access policy may indicate that the wrapper 504 should open the transmit window 630 when an application and/or socket call on the exclusion list attempts to transfer data. As another example, the communication access policy may indicate that the wrapper 504 should close the transmit window 630 when only applications and/or socket calls on the inclusion lists attempt to transfer data.

In an embodiment, the communication access policy may indicate that the wrapper 504 should open the transmit window 630 when the device 200 enters the active mode. For example, the communication access policy may indicate that the wrapper 504 should open the transmit window 630 when a user interface 822 (FIG. 8) receives input. In another embodiment, the wrapper 504 may not open the transmit window 630 when the device 200 enters the active mode, but may otherwise disable the wrapper 504 and/or stop delaying communications when the device 200 is in the active mode.

In an embodiment, the communication access policy includes a list of times, dates, and/or locations in which the wrapper 504 should or should not delay application communications. For example, the communication access policy may indicate that the wrapper 504 should or should not delay communications between certain hours or the day, during certain days of the week, when the device 200 is in certain cities or countries, etc. In various embodiments, time, date, and/or location policies can be specified with granularities specific to one or more particular applications and/or socket operations.

In an embodiment, the server 110 can receive information regarding the state of the communication network 104. For example, the server 110 can determine how long Network Address Translation (NAT) tables in the communication network 104 maintain their records. The server 110 can adjust the communication access policy to indicate that the wrapper 504 should open the transmit window 630 with a frequency sufficient for applications to refresh their NAT entries, to keep their connections alive, etc.

In various embodiments, the communication access policy can combine two or more access criteria such as the aforementioned timing information, application lists, communication types, network conditions, etc. For example, the communication access policy can indicate that all traffic to port 80 can be delayed by up to 5 minutes when the device 802 is in standby. As another example, the communication access policy can indicate that, when the device 802 is in standby, only a WLAN interface can be used. As another example, the communication access policy can indicate that "connect( )" socket calls from "Application X" may complete without delay while the device 802 is in standby. At the same time, the communication access policy can indicate that "connect( )" and "write( )" socket calls from "Application Y" may be delayed while the device 802 is in standby. Likewise, the communication access policy can incorporate other delay criteria such as, for example, which socket operations are attempted, the source and/or destination ports of attempted communications, the destination IP address, etc. As another example, the communication access policy can indicate that communications may be delayed when the radio access technology is High Speed Packet Access (HSPA), but may not be delayed when the radio access technology is LTE. A person having ordinary skill in the art will understand that the aforementioned aspects of the communication access policy can be combined in a variety of ways.

FIG. 8 shows an exemplary device 802 configured to implement a communication access policy. The device may be employed within the network environment 100, described above with respect to FIG. 1. The device 802 is an example of a device that may be configured to implement the various methods described herein. For example, the device 802 may implement one or more functions of the wireless device 102. In another embodiment, the device 802 may implement one or more functions of the server 110.

The device 802 may include a processor 804 which controls operation of the device 802. The processor 804 may also be referred to as a central processing unit (CPU). The memory 806, which may include both read-only memory (ROM) and random access memory (RAM), provides instructions and data to the processor 804. A portion of the memory 806 may also include non-volatile random access memory (NVRAM). The processor 804 may perform logical and arithmetic operations based on program instructions stored within the memory 806. The instructions in the memory 806 may be executable to implement the methods described herein.

When the device 802 is implemented or used as the wireless device 102, the processor 804 may be configured to execute one or more applications, which may be stored in the memory 806. During execution, the applications may initiate communication over the transceiver 814, the transmitter 810, and/or the receiver 812. The processor 804 may implement the hardware/software system 500, described above with respect to FIG. 5. Accordingly, the processor 804 may monitor the communications of executed applications, record communication statistics, receive a communication access policy via the receiver 812, and may store the communication access policy in the memory 806. The processor 804 may implement the communication access policy as described above with respect to FIGS. 6-7.

The processor 804 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The device 802 may also include a housing 808 that may include a transmitter 810 and/or a receiver 812 to allow transmission and reception of data between the device 802 and a remote location. The transmitter 810 and receiver 812 may be combined into a transceiver 814. An antenna 816 may be attached to the housing 808 and electrically coupled to the transceiver 814. In some embodiments, the antenna 816 may be omitted, and the device 802 may be configured for wired communication. The device 802 may also include (not shown) multiple transmitters, multiple receivers, multiple transceivers, and/or multiple antennas.

The device 802 may also include a signal detector 818 that may be used in an effort to detect and quantify the level of signals received by the transceiver 814. The signal detector 818 may detect such signals as total energy, energy per subcarrier per symbol, power spectral density and other signals. The device 802 may also include a digital signal processor (DSP) 820 for use in processing signals. The DSP 820 may be configured to generate a packet for transmission. In some aspects, the packet may comprise a physical layer data unit (PPDU).

The device 802 may further comprise a user interface 822 in some aspects. The user interface 822 may comprise a proximity detector, one or more input buttons, a keypad, a microphone, a speaker, an interface port (for example, a Universal Serial Bus (USB) port, a High-Definition Multimedia Interface (HDMI) port, etc.), a touchscreen, a network interface, and/or a display. The user interface 822 may include any element or component that conveys information to a user of the device 802 and/or receives input from the user. In an embodiment, the user interface 822 may be considered active when it is receiving input, or sending output (for example, from a USB port, network interface, to a display, from a microphone, etc.). The user interface 822 may also be considered active when it has received input, or has sent output within a threshold time period (for example, 1 second, 1 minute, 5 minutes, etc.). The user interface 822 may be considered inactive or idle when it is not active.

When the user interface 822 receives no input, the device 802 may be said to be in a background state, or an idle mode. In the background state, a display may be off, and one or more functions of the device 802 may be disabled. In an embodiment, processes and communications of the device 802 that are not initiated in response to user interface 822 input may be referred to as background or idle processes or communications.

When the user interface 822 receives input, the device 802 may be said to be in a foreground state, or an active mode. In the foreground state, the display may be on, and input may have been received within an input idle period. The input idle period may be configurable and may be, for example, 1 minute. In an embodiment, background processes and communications may occur in the active mode, but may not be initiated in direct response to user interface 822 input.

The various components of the device 802 may be coupled together by a bus system 826. The bus system 826 may include a data bus, for example, as well as a power bus, a control signal bus, and a status signal bus in addition to the data bus. Those of skill in the art will appreciate the components of the device 802 may be coupled together or accept or provide inputs to each other using some other mechanism.

Although a number of separate components are illustrated in FIG. 8, those of skill in the art will recognize that one or more of the components may be combined or commonly implemented. For example, the processor 804 may be used to implement not only the functionality described above with respect to the processor 804, but also to implement the functionality described above with respect to the signal detector 818 and/or the DSP 820. Further, each of the components illustrated in FIG. 8 may be implemented using a plurality of separate elements.

Figure 9:
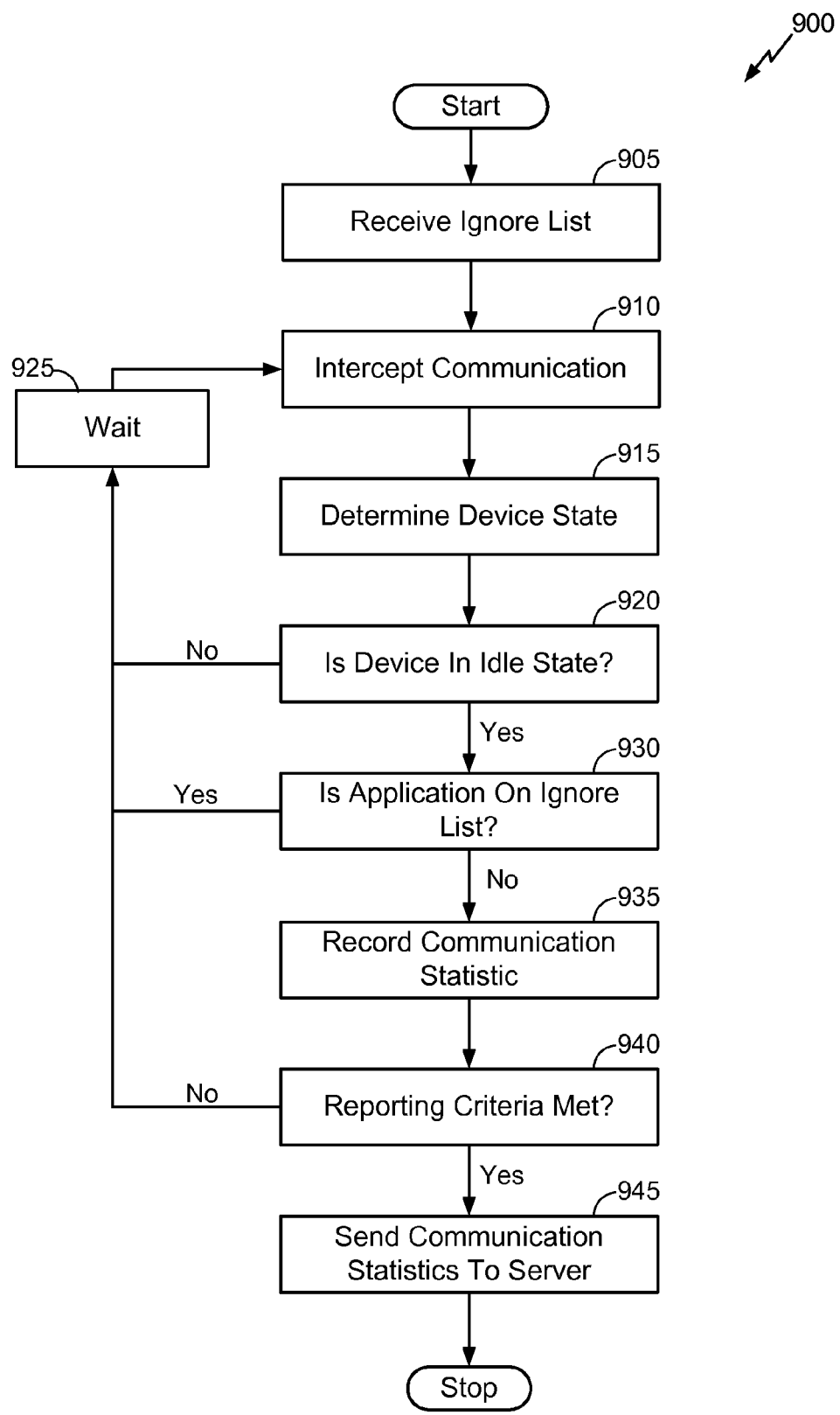
FIG. 9 shows a flowchart of an exemplary method of collecting communication statistics.

FIG. 9 shows a flowchart 900 of an exemplary method of collecting communication statistics. Although the method of flowchart 900 is described herein with reference to the device 802 discussed above with respect to FIG. 8, a person having ordinary skill in the art will appreciate that the method of flowchart 900 may be implemented by the wireless device 102 discussed above with respect to FIG. 1, the wireless device 202 discussed above with respect to FIG. 2, and/or any other suitable device. In an embodiment, the steps in flowchart 900 may be performed by the processor 805 in conjunction with the transmitter 810, the receiver 812, the memory 806, and the user interface 822. Although the method of flowchart 900 is described herein with reference to a particular order, in various embodiments, blocks herein may be performed in a different order, or omitted, and additional blocks may be added.

First, at block 905, the device 802 receives the ignore list via the receiver 812. The processor 804 may store the ignore list in the memory 806. In an embodiment, the device 802 receives the ignore list from the server 110. In an embodiment, the ignore list may be pre-provisioned on the device 802. As discussed above with respect to FIG. 8, the ignore list may specify one or more applications for which the device 802 should not monitor or record communication statistics. In various embodiments, the device 802 may also receive other information from the server 110, such as the inclusion list and/or the exclusion list.

Next, at block 910, the processor 804 intercepts one or more communications from an application executing on the processor 804. The processor 804 may intercept the communications via facilities described above with respect to the communication management system 108 and/or the connectivity engine 208. In an embodiment, the DSP 820, the signal detector 818, the transmitter 810, and/or the transceiver 814 may intercept the communications.

Then, at block 915, the processor 804 determines a device state. The device may be in one of at least two states, which may include a background state and a foreground state. The processor 804 may determine the state of the device via the user interface 822.

Subsequently, at block 920, the processor 804 determines whether the device is in the background state. If the device is in the foreground state, the processor 804 does not record communication statistics and waits for further communication at block 925. If the device is in the background state, the processor 804 continues to block 930.

In an embodiment, at block 920, the processor 804 determines whether the intercepted communication is a background communication. If the intercepted communication is not a background communication, the processor 804 does not record communication statistics and waits for further communication at block 925. If the intercepted communication is a background communication, the processor 804 continues to block 930.

Thereafter, at block 930, the processor 804 determines whether the application associated with the intercepted communication is on the ignore list received from the server 110. If the application that generated the intercepted communication is on the ignore list, the processor 804 does not record communication statistics and waits for further communication at block 925. If the application that generated the intercepted communication is not on the ignore list, the processor 804 continues to block 935.

Afterward, at block 935, the processor 804 records one or more communication statistics based on the intercepted application communication. Communication statistics may include, for example, an application identifier (e.g. a full or partial name, or a numerical identifier) for an applications active during the idle mode, an amount of data transferred by the application, how many connections the application initiated, a number of Transmission Control Protocol (TCP) requests made by the application, a number of User Datagram Protocol (UDP) packets sent, a number of Domain Name Service (DNS) requests sent, etc. TCP request statistics may include statistics about specific requests such as "connect," "write," "FIN," "RST", etc. The communication statistics may include raw data, or calculated statistics such as min, max, mean, median, standard deviation, etc. of requests or packets during a specified time window. The communication statistics may also include additional information such as, for example, a device identifier, a SIM card identifier, a home network identity, a mobile country code, a mobile network code, a location of the device 802, etc. The processor 804 may store the recorded communication statistics in the memory 806, and may compress, encrypt or otherwise encode the recorded communication statistics via the DSP 820.

Next, at block 940, the processor 804 determines whether to report the accumulated communication statistics. The processor 804 may determine reporting criteria, such as a threshold number of recorded statistics, that will cause the processor 804 to report the communications statistics to the server 110. In an embodiment, the processor 804 may report recorded communication statistics on a periodic basis, such as hourly, daily, weekly, monthly, etc. In an embodiment, the processor 804 may report recorded communication statistics when the number of recorded statistics reaches a threshold value and/or when the size of the recorded statistics reaches a threshold value. In an embodiment, the processor 804 may only report statistics when a specified radio is enable, for example, a Wi-Fi or cellular radio. The processor 804 may combine one or more of the aforementioned reporting criteria, or use additional criteria. In an embodiment, the processor 804 may receive instructions about how and when to report communication statistics from the server 110. If the processor 804 determines that the reporting criteria has not been met, the processor does not report the recorded communication statistics and waits at block 925 If the processor 804 determines that the reporting criteria has been met, the processor continues to block 945.

Finally, at block 945, the processor 804 sends the recorded communication statistics to the server 110, via the transmitter 810 and/or the transceiver 814. The processor 804 may send the recorded communication statistics via an HTTP POST method, a File Transfer Protocol (FTP) transfer, as an e-mail, or via any other communication means. After the processor 804 sends the recorded communication statistics to the server 110, the processor 804 may delete the recorded communication statistics from the memory 806, or may retain the recorded communication statistics for later use. When sending the recorded communication statistics to the server 110, the processor 804 may receive a response from the server 110, which may include one or more of the ignore list, the exclusion list, the inclusion list, a list of instructions about when to report communication statistics, and a list of instructions about how to record communication statistics.

Figure 10:
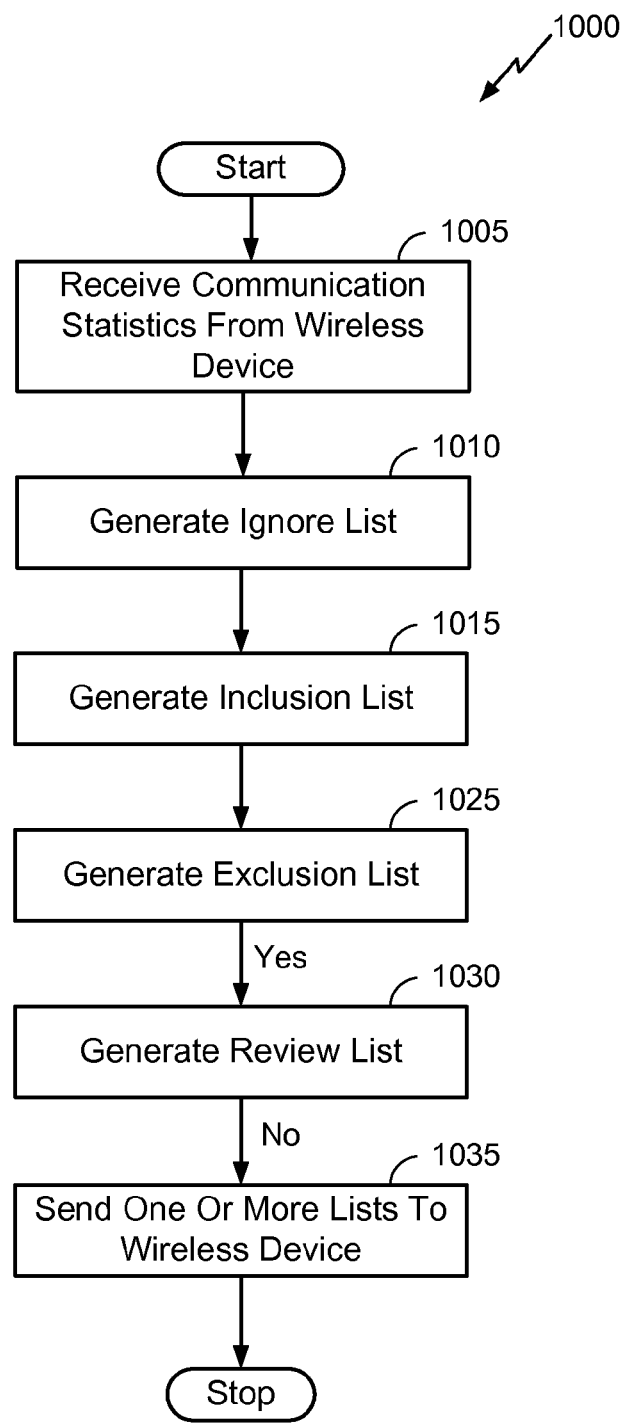
FIG. 10 shows a flowchart of an exemplary method of analyzing communication statistics.

FIG. 10 shows a flowchart 1000 of an exemplary method of analyzing communication statistics. Although the method of flowchart 100 is described herein with reference to the device 802 discussed above with respect to FIG. 8, a person having ordinary skill in the art will appreciate that the method of flowchart 100 may be implemented by the server 110 discussed above with respect to FIG. 1 or any other suitable device. In an embodiment, the steps in flowchart 1000 may be performed by the processor 805 in conjunction with the transmitter 810, the receiver 812, and the memory 806. Although the method of flowchart 1000 is described herein with reference to a particular order, in various embodiments, blocks herein may be performed in a different order, or omitted, and additional blocks may be added.

First, at block 1005, the processor 804 receives communication statistics from the wireless device 102. Communication statistics may include, for example, an application identifier (e.g. a full or partial name, or a numerical identifier), a number of Transmission Control Protocol (TCP) requests made by the application, a number of User Datagram Protocol (UDP) packets sent, a number of Domain Name Service (DNS) requests sent, etc. TCP request statistics may include statistics about specific requests such as "connect," "write," "FIN," "RST", etc. The communication statistics may include raw data, or calculated statistics such as min, max, mean, median, standard deviation, etc. of requests or packets during a specified time window. The communication statistics may also include additional information such as, for example, a device identifier, a SIM card identifier, a home network identity, a mobile country code, a mobile network code, a location of the device 802, etc. The processor 804 may store the received communication statistics in the memory 806, and may compress, encrypt or otherwise encode the received communication statistics via the DSP 820.

Next, at block 1010, the processor 804 generates the ignore list. The processor 804 may generate the ignore list based on the received communication statistics from the device 102 and/or communication statistics received at other times and/or from other devices. For example, the processor 804 may add an application identifier to the ignore list once it has received a threshold number of communication statistics for that application. In an embodiment, the ignore list may be initially seeded with applications that have already been analyzed. The processor 804 may occasionally remove one or more application identifiers form the ignore list in order to learn whether the application communication behavior has changed over time.

Then, at block 1015, the processor 804 generates the inclusion list. The processor 804 may generate the inclusion list based on the received communication statistics from the device 102 and/or communication statistics received at other times and/or from other devices. For example, the processor 804 may add an application identifier to the inclusion list once the recorded number of communication attempts by the application drops below a threshold. In an embodiment, the inclusion list may be initially seeded with applications that have already been determined to be delay-tolerant. The processor 804 may remove one or more application identifiers form the inclusion list if, for example, the received communication statistics indicate that the application is delay-intolerant.

Subsequently, at block 1020, the processor 804 generates the exclusion list. The processor 804 may generate the exclusion list based on the received communication statistics from the device 102 and/or communication statistics received at other times and/or from other devices. For example, the processor 804 may add an application identifier to the exclusion list once the recorded number of communication attempts by the application surpasses a threshold. In an embodiment, the exclusion list may be initially seeded with applications that have already been determined to be delay-intolerant. The processor 804 may remove one or more application identifiers form the exclusion list if, for example, the received communication statistics indicate that the application is delay-tolerant.

Subsequently, at block 1025, the processor 804 generates a review list. The processor 804 may generate the review list based on the received communication statistics from the device 102 and/or communication statistics received at other times and/or from other devices. For example, the processor 804 may add an application identifier to the review list once the recorded number of communication attempts by the application drops below a threshold. In an embodiment, the review list may be a precursor to the inclusion list. For example, the processor 804 may add candidate applications to the review list for further analysis. Further analysis may be performed by either the processor 804 and/or manually via the user interface 822. In an embodiment, the processor 804 may move an application from the review list to the inclusion list according to a signal from the user interface 822.

Finally, at block 1035, the processor 804 transmits one or more of the aforementioned lists to the wireless device 102 via the transmitter 810 and/or the transceiver 814. The processor 804 may transmit the lists in response to the received communication statistics via, for example, an HTTP POST response. In an embodiment, the processor 804 may push the lists to the wireless device 102. In addition to the aforementioned lists, the processor 804 may transmit a list of instructions about when to report communication statistics and/or a list of instructions about how to record communication statistics.

Figure 11:
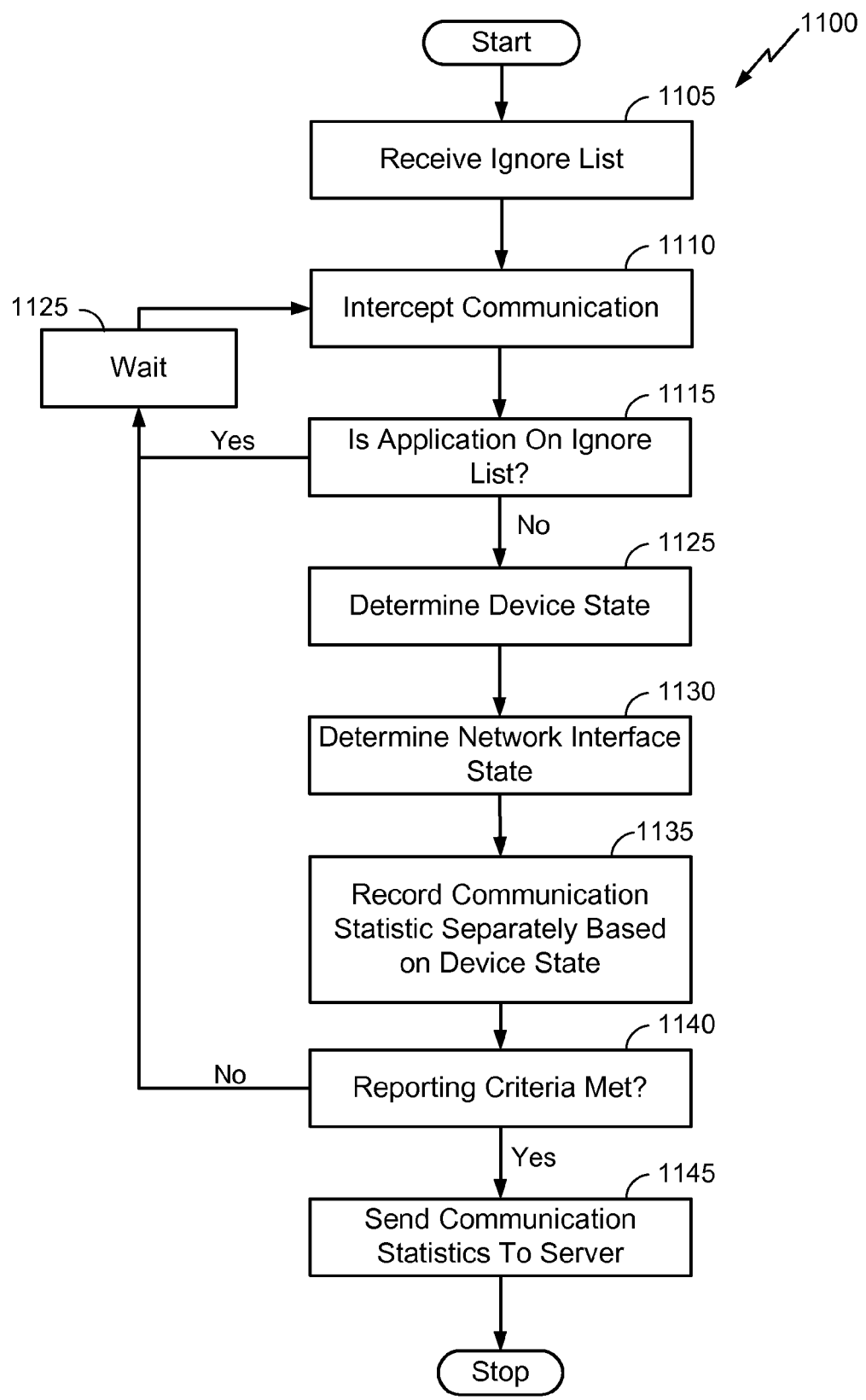
FIG. 11 shows a flowchart of another exemplary method of collecting communication statistics.

FIG. 11 shows a flowchart 1100 of an exemplary method of collecting communication statistics. Although the method of flowchart 1100 is described herein with reference to the device 802 discussed above with respect to FIG. 8, a person having ordinary skill in the art will appreciate that the method of flowchart 1100 may be implemented by the wireless device 102 discussed above with respect to FIG. 1, the wireless device 202 discussed above with respect to FIG. 2, and/or any other suitable device. In an embodiment, the steps in flowchart 1100 may be performed by the processor 805 in conjunction with the transmitter 810, the receiver 812, the memory 806, and the user interface 822. Although the method of flowchart 1100 is described herein with reference to a particular order, in various embodiments, blocks herein may be performed in a different order, or omitted, and additional blocks may be added.

First, at block 1105, the device 802 receives the ignore list via the receiver 812. The processor 804 may store the ignore list in the memory 806. In an embodiment, the device 802 receives the ignore list from the server 110. As discussed above with respect to FIG. 8, the ignore list may specify one or more applications for which the device 802 should not monitor or record communication statistics. In various embodiments, the device 802 may also receive other information from the server 110, such as the inclusion list and/or the exclusion list.

Next, at block 1110, the processor 804 intercepts one or more communications from an application executing on the processor 804. The processor 804 may intercept the communications via facilities described above with respect to the communication management system 108 and/or the connectivity engine 208. In an embodiment, the DSP 820, the signal detector 818, the transmitter 810, and/or the transceiver 814 may intercept the communications.

Thereafter, at block 1115, the processor 804 determines whether the application associated with the intercepted communication is on the ignore list received from the server 110. If the application that generated the intercepted communication is on the ignore list, the processor 804 does not record communication statistics and waits for further communication at block 1120. If the application that generated the intercepted communication is not on the ignore list, the processor 804 continues to block 1125.

Then, at block 1125, the processor 804 determines a state of the device 802. The user interface 826 may be in one of at least two states, which may include a background state and a foreground state. The processor 804 may determine the state of the user interface 822 based on the presence or absence of one or more inputs to the user interface 826. In an embodiment, the processor 804 may determine whether the intercepted is a background communication, generated automatically by an application, as opposed to being generated in response to an input via the user interface 822.

Subsequently, at block 1130, the processor 804 determines a state of a network interface. In an embodiment, the network interface can include the transceiver 814, the transmitter 810, and/or the receiver 812. The network interface may be in one of at least two states, which may include a background state and a foreground state. The processor 804 may determine the state of the user interface 822 based on a radio power and/or connection state of the transceiver 814. In an embodiment, the processor 804 may determine a plurality of network interface states.

Afterward, at block 1135, the processor 804 records one or more communication statistics based on the intercepted application communication. Communication statistics may include, for example, an application identifier (e.g. a full or partial name, or a numerical identifier) for an applications active during the background mode, an amount of data transferred by the application, how many connections the application initiated, a number of Transmission Control Protocol (TCP) requests made by the application, a number of User Datagram Protocol (UDP) packets sent, a number of Domain Name Service (DNS) requests sent, etc. TCP request statistics may include statistics about specific requests such as "connect," "write," "FIN," "RST", etc. The communication statistics may include raw data, or calculated statistics such as min, max, mean, median, standard deviation, etc. of requests or packets during a specified time window. The communication statistics may also include additional information such as, for example, a device identifier, a SIM card identifier, a home network identity, a mobile country code, a mobile network code, a location of the device 802, etc.

The processor 804 may store the recorded communication statistics in the memory 806, and may compress, encrypt or otherwise encode the recorded communication statistics via the DSP 820. The processor 804 may store the communication statistics separately, based on the states of the user interface 826 and/or the network interface. For example, the processor 804 may store the communication statistics separately for each of the following states of the wireless device 802: user interface 826 active and network interface active, user interface 826 active and network interface inactive, user interface 826 inactive and network interface active, and/or user interface 826 inactive and network interface inactive. As used herein, the processor 804 may store the communication statistics "separately" by maintaining a plurality of different databases, by tagging each communication statistic with a state of the user interface 826 and/or the network interface, etc. A person having ordinary skill in the art will appreciate that separate storage of the communication statistics can be accomplished in any manner that allows differentiation between communication statistics recorded during different states of the wireless device 802. In various embodiments, the processor 804 may separately store communication statistics based on other states of the wireless device 802 such as, for example, a power state, a clock state indicating a time and/or date, a network access state, etc.

Next, at block 1140, the processor 804 determines whether to report the accumulated communication statistics. The processor 804 may determine reporting criteria, such as a threshold number of recorded statistics, that will cause the processor 804 to report the communications statistics to the server 110. In an embodiment, the processor 804 may report recorded communication statistics on a periodic basis, such as hourly, daily, weekly, monthly, etc. In an embodiment, the processor 804 may report recorded communication statistics when the number of recorded statistics reaches a threshold value and/or when the size of the recorded statistics reaches a threshold value. In an embodiment, the processor 804 may only report statistics when a specified radio is enable, for example, a Wi-Fi or cellular radio. The processor 804 may combine one or more of the aforementioned reporting criteria, or use additional criteria. In an embodiment, the processor 804 may receive instructions about how and when to report communication statistics from the server 110. If the processor 804 determines that the reporting criteria has not been met, the processor does not report the recorded communication statistics and waits at block 1125 If the processor 804 determines that the reporting criteria has been met, the processor continues to block 1145.

Finally, at block 1145, the processor 804 sends the recorded communication statistics to the server 110, via the transmitter 810 and/or the transceiver 814. The processor 804 may send the recorded communication statistics via an HTTP POST method, a File Transfer Protocol (FTP) transfer, as an e-mail, or via any other communication means. After the processor 804 sends the recorded communication statistics to the server 110, the processor 804 may delete the recorded communication statistics from the memory 806, or may retain the recorded communication statistics for later use. When sending the recorded communication statistics to the server 110, the processor 804 may receive a response from the server 110, which may include one or more of the ignore list, the exclusion list, the inclusion list, a list of instructions about when to report communication statistics, and a list of instructions about how to record communication statistics.

Figure 12:
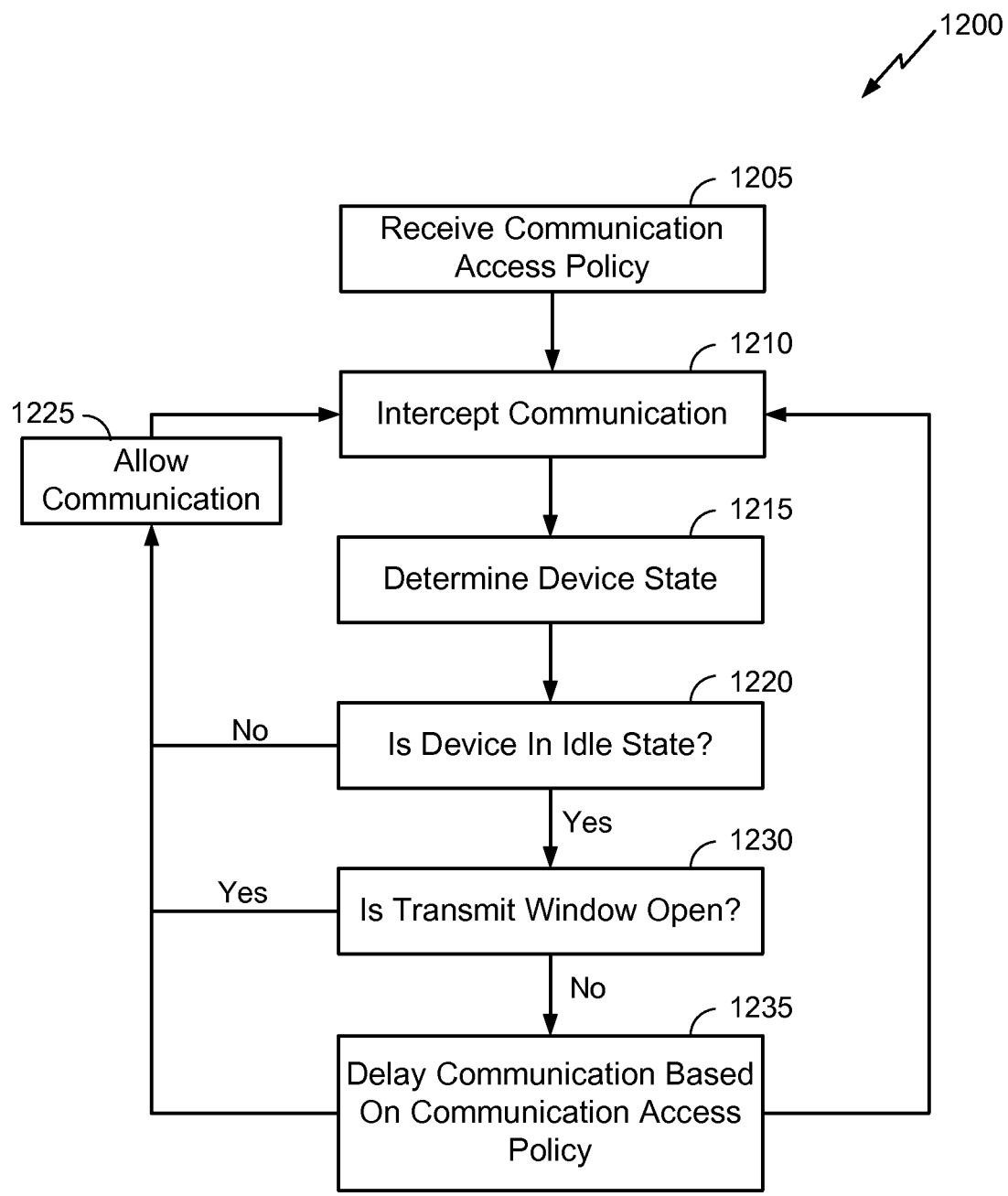
FIG. 12 shows a flowchart of an exemplary method of implementing the communication access policy.

FIG. 12 shows a flowchart 1200 of an exemplary method of applying the communication access policy. In one embodiment, one or more aspects of the flowchart 1200 can correspond to block 308 of FIG. 3. Although the method of flowchart 1200 is described herein with reference to the device 802 discussed above with respect to FIG. 8, a person having ordinary skill in the art will appreciate that the method of flowchart 1200 may be implemented by the wireless device 132 discussed above with respect to FIG. 1, the wireless device 202 discussed above with respect to FIG. 2, and/or any other suitable device. In an embodiment, the steps in flowchart 1200 may be performed by the processor 805 in conjunction with the transmitter 810, the receiver 812, the memory 806, and the user interface 822. Although the method of flowchart 1200 is described herein with reference to a particular order, in various embodiments, blocks herein may be performed in a different order, or omitted, and additional blocks may be added.

First, at block 1205, the device 802 receives the communication access policy via the receiver 812. The processor 804 may store the communication access policy in the memory 806. In an embodiment, the device 802 receives the communication access policy from the server 110. As discussed above with respect to FIGS. 7-8, the communication access policy may specify how the device 802 should delay application communication.

Next, at block 1210, the processor 804 intercepts one or more communications from an application executing on the processor 804. The processor 804 may intercept the communications via facilities described above with respect to the communication management system 138 and/or the connectivity engine 208. In an embodiment, the DSP 820, the signal detector 818, the transmitter 810, and/or the transceiver 814 may intercept the communications.

Then, at block 1215, the processor 804 determines a device state. The device may be in one of at least two states, which may include a foreground state and a background state. In an embodiment, the foreground state can be a foreground state, and the background state can be a background state. The processor 804 may determine the state of the device via the user interface 822. In an embodiment, the processor 804 may determine whether the intercepted is a background communication, generated automatically by an application, as opposed to being generated in response to an input via the user interface 822.

Subsequently, at block 1220, the processor 804 determines whether the device 802 is in the background state. If the device is in the not in the background state, the processor 804 does not delay the application communication and allows the communication to proceed at block 1225. If the device is in the background state, the processor 804 continues to block 1230. In one embodiment, blocks 1215 and 1220 can be omitted, and application communications may be delayed regardless of whether the device 802 is in the background state.

Thereafter, at block 1230, the processor 804 determines whether the transmit window 630 is open. As discussed above with respect to FIGS. 6-7, the processor 804 can determine whether to open the transmit window 630 based on the communication access policy. For example, the processor 804 may open the transmit window 630 if the intercepted application communication is not in the inclusion list. In an embodiment, determining whether the transmit window 630 is open can include opening the transmit window 630 in response to an application communication, event, or other trigger. If the transmit window 630 is open, the processor 804 does not delay the application communication and allows the communication to proceed at block 1225. If the transmit window 630 is closed, the processor 804 continues to block 1235.

After, at block 1235, the processor 804 delays the intercepted communication in accordance with the communication access policy. For example, the processor 804 may determine one or more delay criteria of: a list of applications for which communication may be delayed (an "inclusion list"), a list of applications for which communication may not be delayed (an "exclusion list"), a list of communication types for which communication may or may not be delayed, a list of network conditions during which communication may or may not be delayed, an indication of times during which communication may or may not be delayed, and an indication of locations in which communications may or may not be delayed. The processor 804 will allow or delay the application communication based on the determined delay criteria. In some embodiments, the processor 804 may determine additional delay criteria. If the processor 804 determines that the application communication should be allowed, the processor 804 continues to block 1225. If the processor 804 determines that the application communication should be delayed, the processor 804 continues to block 1210.

Figure 13:
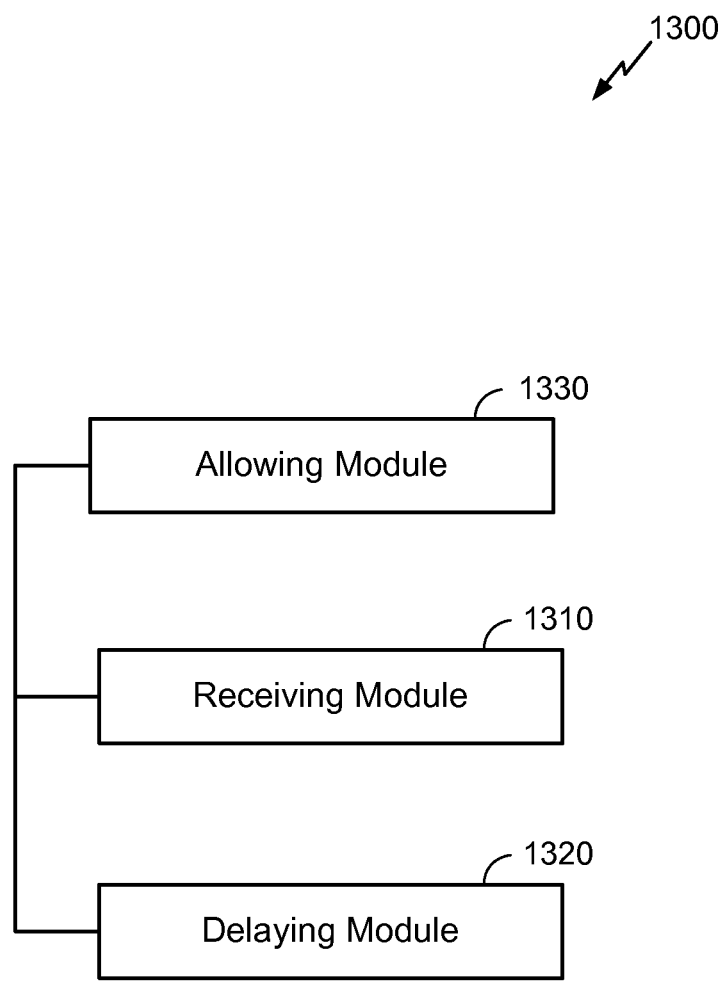
FIG. 13 shows another exemplary device configured to implement the communication access policy.

FIG. 13 shows another exemplary device 1300 configured to implement the communication access policy. The device 1300 comprises a receiving module 1310, a delaying module 1320, and an allowing module 1330. The receiving module 1310 may be configured to perform one or more of the functions discussed above with respect to the block 1205 illustrated in FIG. 12. The receiving module 1310 may correspond to one or more of the receiver 812, the processor 804, the transceiver 814, and the memory 806, discussed above with respect to FIG. 8. The receiving module 1310 may also correspond to one or more of the TX/RX radio 212 and the processor 202, discussed above with respect to FIG. 2.

The delaying module 1320 may be configured to perform one or more of the functions discussed above with respect to the block 1235 illustrated in FIG. 12. The delaying module 1320 may correspond to one or more of the processor 804 and the transmitter 810, discussed above with respect to FIG. 8. The delaying module 1320 may also correspond to one or more of the TX/RX radio 212, the connectivity engine 208, the networking module 210, and the processor 202, discussed above with respect to FIG. 2.

The allowing module 1330 may be configured to perform one or more of the functions discussed above with respect to the block 1225 illustrated in FIG. 12. The allowing module 1330 may correspond to one or more of the processor 804 and the transmitter 810, discussed above with respect to FIG. 8. The allowing module 1330 may also correspond to one or more of the TX/RX radio 212, the connectivity engine 208, the networking module 210, and the processor 202, discussed above with respect to FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A wireless device comprising:
    a network interface configured to exchange data with a communication network;
    an input device configured to receive one or more inputs; and
    a processor electrically connected to the network interface, the processor being configured to:
        determine whether the device is in a background state or a foreground state based on the presence or absence of one or more inputs;
        execute a plurality of applications configured to communicate with the communication network via the network interface;
        collect one or more communication statistics, for one or more of the plurality of applications, when the device is in the background state; and
        when the device is in the foreground state, either:
            collect, separately from the communication statistics collected when the device is in the background state, the one or more communication statistics; or
            refrain from collecting the one or more communication statistics; and
        wherein the network interface is further configured to receive an instruction from a server, the instruction comprising at least one of:
            a list of applications the processor should include and/or exclude when delaying communications; or
            a list of application socket operations the processor should include and/or exclude when delaying communications.

2. The wireless device of claim 1, wherein the network interface is further configured to transmit the communication statistics to the server.

3. The wireless device of claim 2,
    wherein the processor is further configured to collect the one or more communication statistics in accordance with the instruction.

4. The wireless device of claim 2,
    wherein the network interface is configured to report the one or more communication statistics in accordance with the instruction.

5. The wireless device of claim 1, wherein the processor is further configured to:
    intercept a communication from an application;
    determine whether the application generated the intercepted communication while the device is in background state; and
    separately collect the one or more communication statistics for the intercepted communication when the application generated the intercepted communication in response to a foreground state.

6. The wireless device of claim 2,
    wherein the processor is further configured to delay one or more communications in accordance with the instruction.

7. The wireless device of claim 3, wherein the instruction comprises a list of applications the processor should include and/or exclude when collecting the communication statistics.

8. The wireless device of claim 3, wherein the instruction comprises a list of socket operations the processor should include and/or exclude when collecting the communication statistics.

9. The wireless device of claim 4, wherein the instruction comprises a list of communication networks over which the network interface should transmit the communication statistics.

10. The wireless device of claim 4, wherein the instruction comprises instructions indicating when the network interface should transmit the communication statistics.

11. The wireless device of claim 1, wherein the communication statistics comprise a list of applications active during the background mode.

12. The wireless device of claim 1, wherein the communication statistics comprise, for each application, a number of connections initiated by one or more applications during background mode.

13. The wireless device of claim 1, wherein the communication statistics comprise, for each application, an amount of data transferred during the background mode, and wherein the communication statistics comprise one or more socket operations and a count of the number of socket operations performed.

14. The wireless device of claim 1, wherein the processor is configured to classify the communication statistics by application and socket operation type.

15. The wireless device of claim 14, wherein the socket operation type comprises at least one operation from the list of: bind( ), connect( ), accept( ), send( ), recv( ), write( ), read( ), sendto( ), recvfrom( ), close( ), gethostbyname( ), and gethostbyaddr( ).

16. The wireless device of claim 1, wherein the communication statistics comprise a time at which the processor began collecting the communication statistics and a time at which the processor ceased collecting the communication statistics.

17. The apparatus of claim 1, wherein the communication statistics comprise information identifying a communication interface used for one or more socket operations.

18. A method of collecting application communication statistics, the method comprising:
    determining whether a device is in a foreground state or a background state based on the presence or absence of one or more inputs;
    executing a plurality of applications configured to communicate with a communication network;
    collecting one or more communication statistics, for one or more of the plurality of applications, when the device is in the background state;
    when the device is in the foreground state, either:
        collecting, separately from the communication statistics collected when the device is in the background state, the one or more communication statistics; or
        refraining from collecting the one or more communication statistics; and
    receive an instruction from a server, the instruction comprising at least one of:
        a list of applications the processor should include and/or exclude when delaying communications; or
        a list of application socket operations the processor should include and/or exclude when delaying communications.

19. The method of claim 18, further comprising transmitting the communication statistics to the server.

20. The method of claim 19, further comprising
    collecting the one or more communication statistics in accordance with the instruction.

21. The method of claim 19, further comprising transmitting the one or more communication statistics in accordance with the instruction.

22. The method of claim 18, further comprising:
intercepting a communication from an application;
determining whether the application generated the intercepted communication in response to a user interface input; and
separately collecting the one or more communication statistics for the intercepted communication when the application generated the intercepted communication in response to a user interface input.

23. The method of claim 19, further comprising delaying one or more communications in accordance with the instruction.

24. The method of claim 20, wherein the instruction comprises a list of applications to include and/or exclude when collecting the communication statistics.

25. The method of claim 20, wherein the instruction comprises a list of socket operations to include and/or exclude when collecting the communication statistics.

26. The method of claim 21, wherein the instruction comprises a list of communication networks over which the communication statistics should be transmitted.

27. The method of claim 21, wherein the instruction comprises instructions indicating when the communication statistics should be transmitted.

28. The method of claim 18, wherein the communication statistics comprise a list of applications active during the background mode.

29. The method of claim 18, wherein the communication statistics comprise, for each application, a number of connections initiated by one or more applications during the background mode.

30. The method of claim 18, wherein the communication statistics comprise, for each application, an amount of data transferred during the background mode, and wherein the communication statistics comprise one or more socket operations and a count of the number of socket operations performed.

31. The method of claim 18, further comprising classifying the communication statistics by application and socket operation type.

32. The method of claim 31, wherein the socket operation type comprises at least one operation from the list of: bind( ), connect( ), accept( ), send( ), recv( ), write( ), read( ), sendto( ), recvfrom( ), close( ) gethostbyname( ), and gethostbyaddr( ).

33. The method of claim 18, wherein the communication statistics comprise a time at which collection of the communication statistics and a time at which collection of the communication statistics.

34. The method of claim 18, wherein the communication statistics comprise information identifying a communication interface used for one or more socket operations.

35. An apparatus for collecting application communication statistics, the apparatus comprising:
means for determining whether the apparatus is in a foreground state or a background state based on the presence or absence of one or more inputs;
means for executing a plurality of applications configured to communicate with a communication network;
means for collecting one or more communication statistics, for one or more of the plurality of applications, when the apparatus is in the background state;
either:
means for collecting, separately from the communication statistics collected when the device is in the background state, the one or more communication statistics when the device is in the foreground state; or
means for refraining from collecting the one or more communication statistics when the device is in the foreground state: and
means for receiving an instruction from a server, the instruction comprising at least one of:
a list of applications the processor should include and/or exclude when delaying communications; or
a list of application socket operations the processor should include and/or exclude when delaying communications.

36. The apparatus of claim 35, further comprising means for transmitting the communication statistics to the server.

37. The apparatus of claim 36, further comprising
means for collecting the one or more communication statistics in accordance with the instruction.

38. The apparatus of claim 36, further comprising
means for transmitting the one or more communication statistics in accordance with the instruction.

39. The apparatus of claim 35, further comprising:
means for intercepting a communication from an application;
means for determining whether the application generated the intercepted communication in response to a user interface input; and
means for separately collecting the one or more communication statistics for the intercepted communication when the application generated the intercepted communication in response to a user interface input.

40. The apparatus of claim 36, further comprising
means for delaying one or more communications in accordance with the instruction.

41. The apparatus of claim 37, wherein the instruction comprises a list of applications to include and/or exclude when collecting the communication statistics.

42. The apparatus of claim 37, wherein the instruction comprises a list of socket operations to include and/or exclude when collecting the communication statistics.

43. The apparatus of claim 38, wherein the instruction comprises a list of communication networks over which the communication statistics should be transmitted.

44. The apparatus of claim 38, wherein the instruction comprises instructions indicating when the communication statistics should be transmitted.

45. The apparatus of claim 35, wherein the communication statistics comprise a list of applications active during the background mode.

46. The apparatus of claim 35, wherein the communication statistics comprise, for each application, a number of connections initiated by one or more applications during the background mode.

47. The apparatus of claim 35, wherein the communication statistics comprise, for each application, an amount of data transferred during the background mode, and wherein the communication statistics comprise one or more socket operations and a count of the number of socket operations performed.

48. The apparatus of claim 35, further comprising means for classifying the communication statistics by application and socket operation type.

49. The apparatus of claim 48, wherein the socket operation type comprises at least one operation from the list of:

bind( ), connect( ), accept( ), send( ), recv( ), write( ), read( ), sendto( ), recvfrom( ), close( ), gethostbyname( ), and gethostbyaddr( ).

50. The apparatus of claim 35, wherein the communication statistics comprise a time at which the means for collecting began collecting the communication statistics and a time at which the means for collecting ceased collecting the communication statistics.

51. The apparatus of claim 35, wherein the communication statistics comprise information identifying a communication interface used for one or more socket operations.

52. A non-transitory computer-readable medium comprising code that, when executed, causes an apparatus to:
    determine whether the apparatus is in a foreground state or a background state based on the presence or absence of one or more inputs;
    execute a plurality of applications configured to communicate with a communication network;
    collect one or more communication statistics, for one or more of the plurality of applications, when the apparatus is in the background state;
    when the apparatus is in the foreground state, either:
        collect, separately from the communication statistics collected when the apparatus is in the background state, the one or more communication statistics; or
        refrain from collecting the communication statistics: and
    receive an instruction from a server, the instruction comprising at least one of:
        a list of applications the processor should include and/or exclude when delaying communications; or
        a list of application socket operations the processor should include and/or exclude when delaying communications.

53. The medium of claim 52, further comprising code that, when executed, causes the apparatus to transmit the communication statistics to the server.

54. The medium of claim 53, further comprising code that, when executed, causes the apparatus to
    collect the one or more communication statistics in accordance with the instruction.

55. The medium of claim 53, further comprising code that, when executed, causes the apparatus to
    transmit the one or more communication statistics in accordance with the instruction.

56. The medium of claim 52, further comprising code that, when executed, causes the apparatus to:
    intercept a communication from an application;
    determine whether the application generated the intercepted communication in response to a user interface input; and
    separately collect the one or more communication statistics for the intercepted communication when the application generated the intercepted communication in response to a user interface input.

57. The medium of claim 53, further comprising code that, when executed, causes the apparatus to
    delay one or more communications in accordance with the instruction.

58. The medium of claim 54, wherein the instruction comprises a list of applications to include and/or exclude when collecting the communication statistics.

59. The medium of claim 55, wherein the instruction comprises a list of socket operations to include and/or exclude when collecting the communication statistics.

60. The medium of claim 55, wherein the instruction comprises a list of communication networks over which the communication statistics should be transmitted.

61. The medium of claim 55, wherein the instruction comprises instructions indicating when the communication statistics should be transmitted.

62. The medium of claim 52, wherein the communication statistics comprise a list of applications active during the background mode.

63. The medium of claim 52, wherein the communication statistics comprise, for each application, a number of connections initiated by one or more applications during the background mode.

64. The medium of claim 52, wherein the communication statistics comprise, for each application, an amount of data transferred during the background mode, and wherein the communication statistics comprise one or more socket operations and a count of the number of socket operations performed.

65. The medium of claim 52, further comprising code that, when executed, causes the apparatus to classify the communication statistics by application and socket operation type.

66. The apparatus medium of claim 65, wherein the socket operation type comprises at least one operation from the list of: bind( ), connect( ), accept( ), send( ), recv( ), write( ), read( ), sendto( ), recvfrom( ), close( ), gethostbyname( ), and gethostbyaddr( ).

67. The medium of claim 52, wherein the communication statistics comprise a time at which the apparatus began collecting the communication statistics and a time at which the means for collecting ceased collecting the communication statistics.

68. The medium of claim 52, wherein the communication statistics comprise a information identifying a communication interface used for one or more socket operations.

69. The medium of claim 52, further comprising code that, when executed, causes the apparatus to classify the communication statistics by application and socket operation type.

70. The medium of claim 69, wherein the socket operation type comprises at least one operation from the list of: bind( ), connect( ), accept( ), send( ), recv( ), write( ), read( ), sendto( ), recvfrom( ), close( ), gethostbyname( ), and gethostbyaddr( ).

71. The medium of claim 52, wherein the communication statistics comprise a time at which collection of the communication statistics and a time at which collection of the communication statistics.

72. The medium of claim 52, wherein the communication statistics comprise information identifying a communication interface used for one or more socket operations.

* * * * *